US008675511B2

(12) United States Patent
Gorokhov et al.

(10) Patent No.: US 8,675,511 B2
(45) Date of Patent: Mar. 18, 2014

(54) LIST ELIMINATION FOR DISTRIBUTED DOWNLINK COORDINATED MULTI-POINT (COMP) FRAMEWORK

(75) Inventors: Alexei Y. Gorokhov, San Diego, CA (US); Alan Barbieri, San Diego, CA (US); Siddhartha Mallik, San Diego, CA (US); Mohammad J. Borran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 573 days.

(21) Appl. No.: 12/633,692

(22) Filed: Dec. 8, 2009

(65) Prior Publication Data

US 2010/0144334 A1    Jun. 10, 2010

Related U.S. Application Data

(60) Provisional application No. 61/121,340, filed on Dec. 10, 2008.

(51) Int. Cl.
*H04L 12/26* (2006.01)

(52) U.S. Cl.
USPC .......................................................... 370/252

(58) Field of Classification Search
None
See application file for complete search history.

(56) References Cited

U.S. PATENT DOCUMENTS

| 6,449,641 | B1 | 9/2002 | Moiin et al. |
| 7,020,110 | B2 | 3/2006 | Walton et al. |
| 7,308,418 | B2 * | 12/2007 | Malek et al. ................ 705/7.32 |
| 7,706,838 | B2 * | 4/2010 | Atsmon et al. ............... 455/558 |
| 7,995,534 | B2 | 8/2011 | Flore et al. |
| 2003/0040317 | A1 | 2/2003 | Fattouch |
| 2006/0268791 | A1 | 11/2006 | Cheng et al. |
| 2007/0091863 | A1 | 4/2007 | Sampath et al. |
| 2008/0104257 | A1 * | 5/2008 | Olston ........................ 709/228 |
| 2010/0040006 | A1 | 2/2010 | Caire |
| 2010/0041407 | A1 | 2/2010 | Caire et al. |
| 2010/0056215 | A1 | 3/2010 | Gorokhov et al. |

FOREIGN PATENT DOCUMENTS

| CN | 101119585 A | 2/2008 |
| RU | 2325030 C2 | 5/2008 |
| WO | 2004001994 A2 | 12/2003 |
| WO | 2004002001 A2 | 12/2003 |
| WO | 2007138453 | 12/2007 |

OTHER PUBLICATIONS

Huawei: "Inter-eNB and Intra-eNB Schemes for CoMP in LTE-Advanced" 3GPP Draft TSG RAN WG#54; R1-083050, 3rd Generation Partnership Project (3GPP), Jeju, Korea, (Aug. 18-22, 2008).

(Continued)

*Primary Examiner* — Raj Jain
(74) *Attorney, Agent, or Firm* — John J. Ketchum

(57) ABSTRACT

Providing for record filtering in distributed dynamic clustering algorithms for coordinated multipoint (CoMP) wireless communication is described herein. By way of example, strategy selection records distributed as part of a belief propagation network are pruned at recipient nodes, thereby reducing processing overhead for dynamic clustering. As a result, cooperative policies can be determined with greater efficiency, and with greater relevance to local clusters of cooperating base stations. In some aspects, record pruning can comprise identifying and discarding redundant or incompatible sets of policy decisions. In at least one aspect, a number of evaluated records can be capped based on relevance, while preserving deployment-wide applicability of the belief propagation network. Accordingly, dynamic distributed CoMP decisions are optimized on a deployment-wide scale that more efficiently converges to maximum utility solutions.

50 Claims, 13 Drawing Sheets

(56) References Cited

OTHER PUBLICATIONS

International Search Report and Written Opinion—PCT/US2009/067519, International Searching Authority—European Patent Office, Apr. 9, 2010.

International Search Report and Written Opinion—PCT/US2009/055238, International Search Authority—European Patent Office Jul. 16, 2010.

Motorola: "LTE-A Multiple Point Coordination and Its Classification" 3GPP Draft TSG-RAN WG1 #54; R1-083229, 3rd Generation Partnership Project (3GPP), Jeju, South Korea, (Aug. 18-22, 2008).

Papadogiannis, A. et al: "A Dynamic Clustering Approach in Wireless Networks with Multi-Cell Cooperative Processing." IEEE Communications, 2008. Piscataway, NJ, USA, May 19, 2008, pp. 4033-4037.

Texas Instruments: "Network MIMO Precoding" 3rd Generation Partnership Project (3GPP) TSG RAN WG1 #53bis; No. R1-082497, Jul. 4, 2008, pp. 1-4, XP002559609.

3GPP: "3rd Generation Partnership Project; Technical Specification Group Radio Access Network; Further Advancements for E-UTRA Physical Layer Aspects (Release X)" Oct. 6, 2008, 3GPP Draft; TR 36.814_010, 3rd Generation Partnership Project (3GPP), Mobile Competence Centre; 650, Route Des Lucioles; F-06921 Sophia-Antipolis Cedex; France, XP050317365, paragraph [0008].

"A discussion on some technology components for LTE-Advanced" 3GPP Draft; Ri-082024 ILTE-Advanced Technology Components, 3rd Generation Partnership Project (3GPP), Mobile Competence Centre ; 650, Route Des Lucioles ; F-06921 Sophia-Antipolis Cedex ; France, vol. RAN WGI, no. Kansas City, USA; 20080514, May 14, 2008, XP050110365 [retrieved on May 14, 2008] the whole document.

Ericsson: "Downlink coordinated transmission—Impact on specification" Oct. 6, 2008, 3GPP Draft; R1-083931, 3rd Generation Partnership Project (3GPP), Mobile Competence Centre; 650, Route Des Lucioles; F-06921 Sophia-Antipolis Cedex; France, XP050317240.

Jungnickel V et al: "Implementation concepts for distributed cooperative transmission" Oct. 26, 2008, Signals, Systems and Computers, 2008 42nd Asilomar Conference on, IEEE, Piscataway, NJ, USA, pp. 1035-1039, XP031475445.

\* cited by examiner

LIST ELIMINATION FOR DISTRIBUTED DOWNLINK COORDINATED MULTI-POINT (COMP) FRAMEWORK

CLAIM OF PRIORITY UNDER 35 U.S.C §119

The present application for patent claims priority to Provisional Patent Application Ser. No. 61/121,340 entitled "LIST ELIMINATION TO MITIGATE THE EFFECT OF LOOPS IN MESSAGE PASSING" filed Dec. 10, 2008, and assigned to the assignee hereof and hereby expressly incorporated by reference herein.

REFERENCE TO CO-PENDING APPLICATIONS FOR PATENT

The present application for patent is related to U.S. patent application Ser. No. 12/547,395, now U.S. Pat. No. 8,498,647, entitled "DISTRIBUTED DOWNLINK COORDINATED MULTI-POINT (CoMP) FRAMEWORK" filed Aug. 25, 2009, assigned to the assignee hereof, and expressly incorporated by reference herein.

BACKGROUND

1. Field

The following description relates generally to wireless communications, and more particularly to facilitating scheduling policy filtering for distributed dynamic selection of clustering strategies for downlink coordinated multi-point (CoMP) wireless environment.

2. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Traditionally, in a wireless communication network with multiple base stations and multiple mobile devices, each mobile device is typically associated with or served by one of the multiple base stations. For instance, a mobile device can be associated with a given base station as a function of various factors such as signal strength, Channel Quality Indicator (CQI), and so forth. Thus, the mobile device can be served by the given base station (e.g., uplink and downlink transmissions can be exchanged there between, . . . ), while other base stations in a vicinity thereof can generate interference. If the given base station comprises multiple transmit or receive antennas, wireless communication between the given base station and the mobile device can involve multiple input or multiple output strategies, beamforming, and so on. However, interference still results from the other base stations, particularly where no cooperation between the given base station and such other base stations exist.

Recent changes in wireless communications have evolved to mitigate inter-cell interference. One example includes the strategy of fractional resource re-use. In fractional resource re-use, adjacent base stations share resource scheduling for upcoming time slots, and can reduce power or blank resources to reduce interference in an adjacent cell. Other strategies involving inter-base station coordination exist as well, typically designed also to improve communication quality for mobile devices on a cell boundary. In addition, development of these strategies has laid potential groundwork for other cooperation techniques for improving wireless performance, increasing overall throughput, increasing load capacity, and so on.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for improved dynamic clustering of coordinated multipoint (CoMP) wireless communication employing distributed clustering. In distributed clustering, scheduling strategy decisions and corresponding wireless utility estimates are shared among nearby base stations of a wireless network to dynamically coordinate communication in successive time slots or subslots. For large deployments, numbers of decision records can become very large over successive time slot/subslot iterations. In some aspects of the subject disclosure, strategy pruning is employed to reduce the numbers of decision records, thereby reducing processing overhead. As a result, cooperative policies can be determined with greater efficiency, and with greater relevance to local clusters of cooperating base stations. Further, dynamic clustering can be implemented at improved processing times. In particular aspects, strategy pruning can comprise identifying and discarding redundant strategy decisions provided received from different nearby base stations. In alternative or additional aspects, strategy pruning can comprise identifying and discarding strategy decisions that are incompatible with local policies, prior to analyzing groups of local policies and neighboring base station strategy decisions for utility. In at least one aspect, a number of strategy decisions grouped with related local policies can be capped based on relevance, utility, hop distance, or the like, to further reduce processing overhead and policy selection times. Accordingly, the subject disclosure provides a mechanism to accomplish dynamic distributed CoMP communication that maximizes deployment-wide network utility at a processing rate that corresponds with time slot or time subslot constraints.

In one or more particular aspects, the subject disclosure provides a method for wireless networking. The method can comprise employing memory to store code configured for dynamic distributed CoMP wireless communication. Further, the method can comprise employing a processor to execute the code to effect a set of procedures. Specifically, the set of procedures can comprise evaluating a set of local policies of a base station and generating a network utility estimate for respective policies of the set. Additionally, the set of procedures can comprise exchanging utility and policy selection information with a set of additional base stations. Moreover, the set of procedures can comprise identifying a redundant utility estimate from received utility information and generating a truncated network utility matrix that excludes the redundant utility estimate (e.g., wherein the redundant utility estimate is deleted from the matrix of utility and policy selection information to generate the truncated network utility matrix). Furthermore, the set of procedures can also comprise employing the truncated network utility matrix to re-evaluate a subset of the local policies and select a desired policy that at least maximizes a network-wide utility estimate.

According to other aspects, provided is an apparatus for wireless communication in a wireless network. The apparatus can comprise memory for storing a set of modules for conducting dynamic CoMP wireless communication among a set of neighboring base stations. Moreover, the apparatus can comprise at least one processor for executing the set of modules. Particularly, the set of modules can comprise an analysis module that estimates respective utilities for time t of a set of local scheduling strategies employed by a base station and a parsing module that selects a scheduling strategy for use by the base station at time t. Moreover, the set of modules can comprise a cooperation module that shares utility or strategy information with a neighboring base station and aggregates utility or strategy information received from the set of neighboring base stations and a pruning module that truncates aggregated utility or strategy information based at least in part on relevance to the strategy selected at time t.

In still other aspects, disclosed is an apparatus for CoMP wireless communication. The apparatus can comprise means for employing a processor to execute code that selects a scheduling strategy for a base station according to estimated utility of the scheduling strategy and respective utility estimates of scheduling strategies of additional base stations involving the base station. In addition to the foregoing, the apparatus can comprise means for employing the processor to execute code that filters the scheduling strategies of additional base stations involving the base station to remove duplicate or incompatible scheduling strategies. Moreover, the apparatus can also comprise means for employing the processor to execute code that shares a filtered matrix comprising scheduling strategies of the base station and of the additional base stations with a subset of the additional base stations.

Based on another aspect of the subject disclosure, disclosed is at least one processor configured for CoMP wireless communication. The processor(s) can comprise a module for selecting a scheduling strategy for a base station according to estimated utility of the scheduling strategy and respective utility estimates of scheduling strategies of additional base stations involving the base station. Furthermore, the processor(s) can comprise a module for filtering the scheduling strategies of additional base stations involving the base station to remove duplicate or incompatible scheduling strategies and a module for sharing a filtered matrix comprising scheduling strategies of the base station and of the additional base stations with a subset of the additional base stations.

According to yet other aspects, the subject disclosure provides a computer program product comprising a computer-readable medium. The computer-readable medium can comprise code for causing a computer to select a scheduling strategy for a base station according to estimated utility of the scheduling strategy and respective utility estimates of scheduling strategies of additional base stations involving the base station. Further, the computer-readable medium can comprise code for causing the computer to filter the scheduling strategies of additional base stations involving the base station to remove duplicate or incompatible scheduling strategies. Additionally, the computer-readable medium can comprise code for causing the computer to share a filtered matrix comprising scheduling strategies of the base station and of the additional base stations with a subset of the additional base stations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
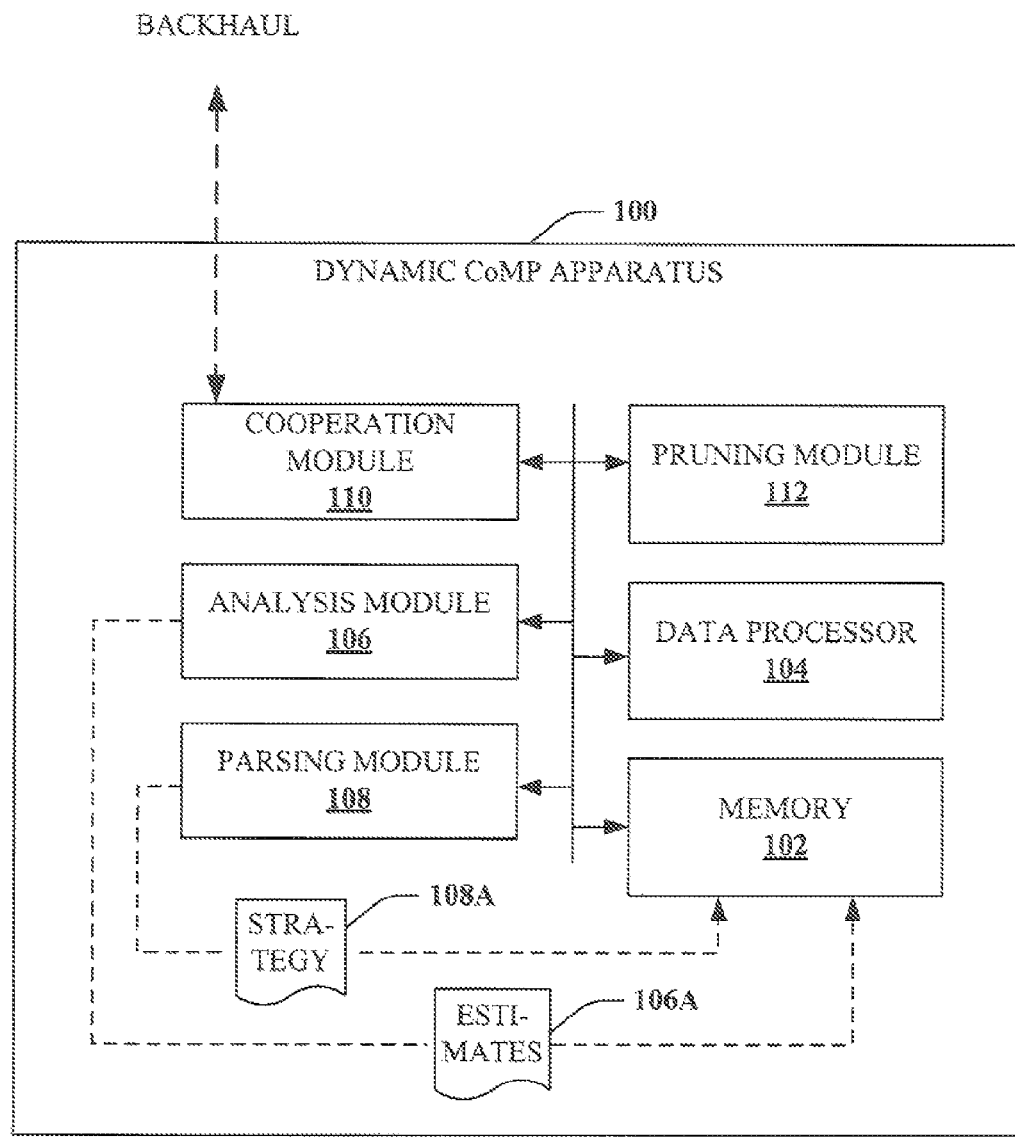
FIG. 1 illustrates a block diagram of an example apparatus that facilitates improved distributed dynamic coordinated multipoint (CoMP) wireless communication.

The disclosed subject matter is described with reference to the drawings, wherein like reference numerals are used to refer to like elements throughout the description. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram or schematic form in order to facilitate describing the subject innovation.

As utilized herein, terms "component," "system," "module," and the like are intended to refer to a computer or electronic-related entity, either hardware, a combination of hardware and software, software (e.g., in execution), or firmware. For example, a module can be a processor, a process running on the processor, an object, an executable, a program, a computer, an electronic circuit, a processing circuit, and so on. The module can include erasable programming (e.g., process instructions at least in part stored in erasable memory) or hard programming (e.g., process instructions burned into non-erasable memory at manufacture). By way of illustration, both a process executed from memory and the processor can be a module. One or more modules can reside within a process or thread of execution and a module can be localized on one processing device (e.g., onboard processing) or distributed between two or more remotely located processing devices (e.g., communicatively connected by a wireless link). As another example, a system can include an arrangement of fixed electronic communication devices (e.g., base station deployment) and mobile electronic communication devices, which coordinate to implement processing instructions in a manner suitable to a distributed set of processing instructions.

Furthermore, the claimed subject matter can be implemented as a method, apparatus, or article of manufacture using typical manufacturing, programming or engineering techniques to produce hardware, firmware, software, or any combination thereof to control an electronic device to implement the disclosed subject matter. The term "article of manufacture" as used herein is intended to encompass an electronic device, a computer, or a computer program accessible from any computer-readable device, carrier, or media. Computer-readable media can include hardware media, or software media. In addition, the media can include storage media, or transport media. For example, computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, wave interface modules (e.g., a wireless communication interface), or the like. Of course, those skilled in the art will recognize many modifications can be made to this configuration without departing from the scope or spirit of the claimed subject matter.

In a conventional wireless communication network, base stations communicate with mobile devices over wireless communication links, utilizing antenna and transmit/receive modules operating on predetermined frequency spectra. The base stations transmit information on a forward link (or downlink—DL) and receive information on a reverse link (or uplink—UL). Conversely, mobile devices receive information on the forward link and transmit information on the reverse link. Various types of multiplexing communication systems exist, utilizing different frequency channels and coding structures. For instance, in a frequency division duplex (FDD) system, a forward link can employ a different frequency band that utilized for a reverse link. In other systems, such as time division duplex (TDD) a common frequency band is utilized for forward and reverse link communication.

Where a base station employs a group of antennas, each antenna can be designated to communicate in different sectors of a cell served by the base station. In communication over a forward link, a base station antenna can utilize beamforming to improve signal-to-noise (SNR) ratio of the forward link. Also, while beamforming is employed for a particular mobile device in a particular sector, mobile devices in neighboring cells can observe reduced interference as compared to a base station transmitting through a single antenna to all mobile devices.

In recent advancements in wireless communication, a group of base stations (e.g., adjacent base stations) can employ dynamic clustering in a coordinated multipoint (CoMP) environment. Such an environment can include a downlink multiple-input multiple output (MIMO) system. Dynamic clustering can enable adaptable cooperation strategies in transmitting data packets to mobile devices that are "visible" to at least a subset of the group of base stations. As utilized herein, a mobile device is visible to a base station if a signal transmitted by that device is received at the base station with at least a minimum signal power. Likewise, the base station is visible to the mobile device if a signal transmitted by the base station is received with a suitable minimum power at the mobile device. As an example, the minimum signal power can be −8 decibels (dB), although the scope of the subject disclosure is not so limited. Since base stations can have different antenna gain factors, observe varying interference levels, and so on, this minimum signal power can be adapted to various powers for various base stations, and for various operator deployments.

Because receive power level is inversely proportional to distance between transmitter and receiver, and because mobile devices are generally free to move with respect to a base station, a set of mobile devices visible to a particular base station can change over time. Accordingly, dynamic clustering involves time-varying cooperation strategies depending on a mutually visible set of mobile devices. Furthermore, base stations participating in a particular cluster can change, depending on dynamic needs of these mobile devices. Dynamic clustering can further mitigate a need for network planning and fixed cluster boundaries, while potentially yielding enhanced throughput, fairness, or throughput/fairness tradeoffs.

In contrast, conventional CoMP approaches typically employ cooperation strategies based on predetermined and fixed clustering of network nodes (e.g., base stations). Static master clusters are commonly chosen based on assumed network topology such as a hexagonal layout or known quality of backhaul links within a Remote Radio Head context (e.g., including one or more remote nodes connected to a macro base station via high quality backhaul links). Moreover, interference at boundaries of these master clusters can be handled by traditional interference management techniques, including fractional reuse as one example. While dynamic cooperative transmissions can be sent within static clusters, such conventional techniques differ from approaches set forth herein where clustering strategies are dynamically selected in a distributed fashion (e.g., where selection occurs among the base stations themselves, rather than a central controller).

In a distributed dynamic CoMP environment, base stations can dynamically select clustering strategies based on changing wireless conditions and network load observed at the respective base stations. This enables a more diverse environment that can converge to an optimal utility, even for a large network of base stations, or an entire network deployment. In such an environment, distributed decisions implemented by disparate base stations can be based on a finite order strategy constraint to limit complexity of inter-site multi-antenna scheduling and packet sharing. Further, a utility based distributed negotiation framework based on message passing (e.g., using a belief propagation framework) can be leveraged by disparate base stations to dynamically yield clustering strategy decisions. In addition, these decisions can be updated over time (e.g., for subsequent wireless time slots, or time subslots) in an iterative manner. Each iteration involves additional message passing among inter-connected base stations (e.g., via respective backhauls), which can eventually cover an entire deployment. More specifically, strategy decisions of respective base stations and associated utility estimates of those decisions can be shared among neighboring base stations. These strategy decisions and utility estimates can be employed in successive cooperative strategy decisions at subsequent times, which are then re-shared among the neighboring base stations. Each iteration of message passing can propagate prior decisions/estimates to a further set of base stations (e.g., one hop per iteration, two hops per iteration, . . . ), eventually covering a large deployment of base stations. Accordingly, distributed scheduling decisions can be utilized to optimize utility of a large base station deployment, after a sufficient number of iterations.

One drawback to the distributed dynamic CoMP environment, such as the example outlined above, is the large number of decisions/estimates that are propagated throughout a network over time. In addition, some decisions/estimates are duplicates, reaching a particular base station via different hop-routes through different base station. Furthermore, some of these decisions/estimates might be incompatible with available cooperative strategies of a particular base station. In both cases, unnecessary processing overhead could be expended for current strategy decisions based on the received messages, and in either case, processing overhead can become very large after successive message passing iterations, even for a very small deployment. Accordingly, mechanisms for filtering received messages for relevance with respect to current strategy decisions can improve efficiency of the distributed dynamic CoMP environment.

Turning now to the figures, FIG. 1 illustrates a block diagram of a dynamic CoMP apparatus 100 that improves efficiency in a distributed dynamic CoMP environment. Apparatus 100 can be deployed in conjunction with one or more network base stations, or can be deployed separately at respective base stations. Further, apparatus 100 can conduct strategy decisions related to cooperative downlink wireless communication among a plurality of such base stations. These strategy decisions can be based on a dynamic set of mobile devices visible to a base station coupled with apparatus 100, and further based on strategy decisions of other cooperative or non-cooperative base stations. According to particular aspects of the subject disclosure, apparatus 100 can provide increased efficiency for such communication, by filtering strategy decisions of other base stations to those most relevant to decisions of apparatus 100.

Figure 4:
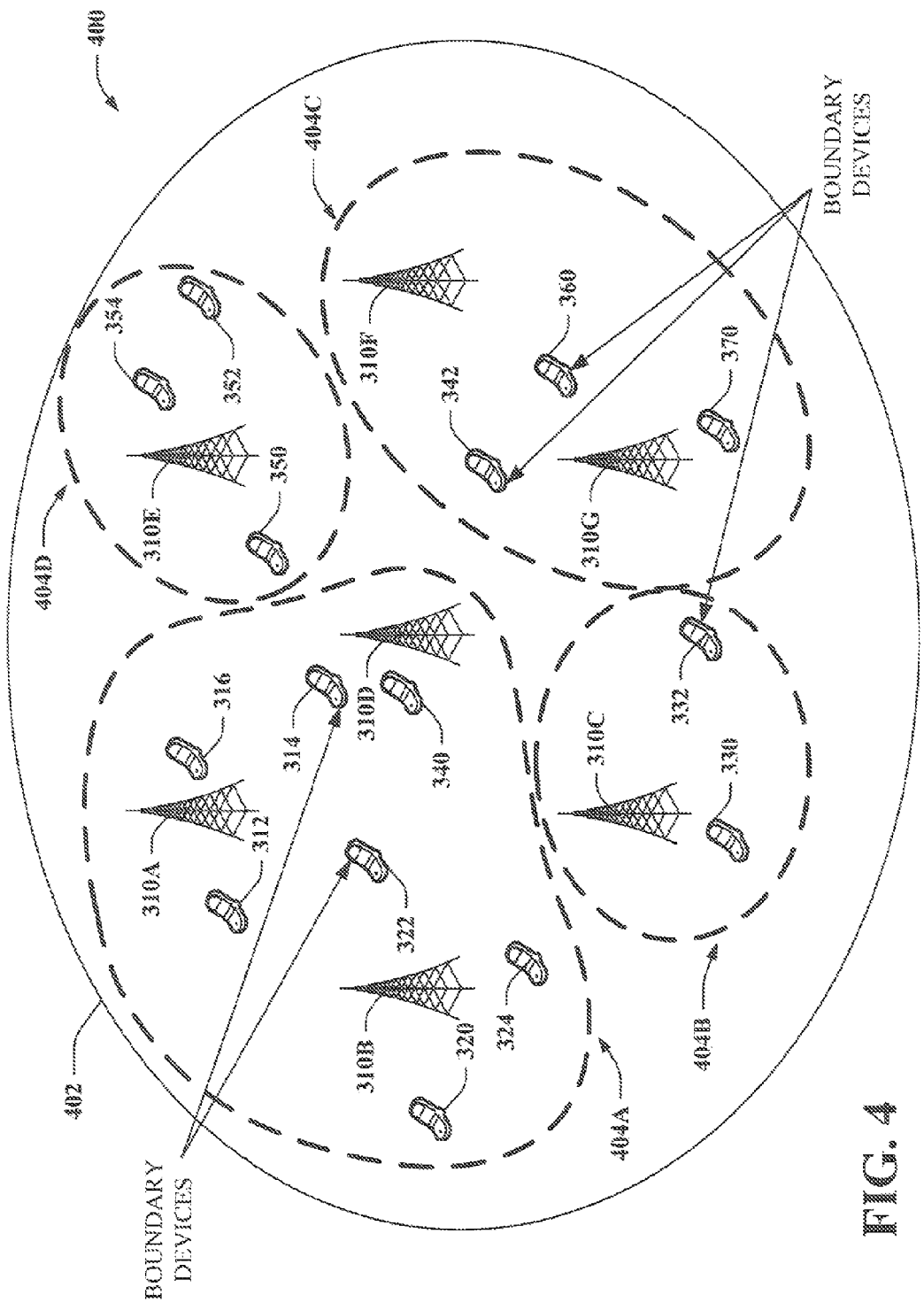
FIG. 4 depicts an example wireless arrangement suitable for dynamic clustering in CoMP wireless communication according to still other aspects.

Dynamic CoMP apparatus 100 comprises memory 102 for storing modules (106, 108, 110, 112) for implementing dynamic cooperative scheduling among a set of base stations (not depicted, but see FIG. 4, infra). Additionally, memory 102 can store scheduling strategies for serving mobile devices (not depicted). The scheduling strategies can include non-cooperative strategies, as well as cooperative strategies. As utilized herein, cooperative strategies refer to rules for transmitting data packets via multiple base stations on one or more forward links. Non-cooperative strategies refer to rules for transmitting data packets via a single base station on a forward link, as are conventionally employed in wireless communication.

Based on wireless conditions between a base station and a set of mobile devices at a time t, apparatus 100 can generate a list of available scheduling strategies applicable to all time slots. The strategies can be refreshed, however, at particular time slots based on changes in those wireless conditions. In one example, the list of available scheduling strategies includes scheduling strategies for all mobile devices visible to a base station coupled with apparatus 100 (e.g., having minimum receive power of −8 dB, or some other suitable minimum receive power). Further, the list of available scheduling strategies includes non-cooperative strategies, as well as strategies involving one other base station (e.g., $2^{nd}$ order strategies), two other base stations (e.g., $3^{rd}$ order strategies), and so on, up to N other base stations, where N can be a suitable design parameter of a wireless deployment. The cooperative strategies can include inter-node packet sharing, as well as various rules for cooperative downlink transmissions (e.g., dynamic silencing, fractional re-use, . . . ). Additionally, the cooperative strategies are built based on z base stations cooperating to serve y mobile devices, where Z and Y are integers. For instance, in an environment comprising three base stations and three mobile devices, the following cooperative and non-cooperative strategies 'Z×Y' can result: 1×1, 2×1, 2×2, 3×1, 3×2, 3×3. (For each cooperative strategy to be implemented, each of the 'Y' mobile devices must be visible to each of the 'Z' base stations, as defined herein).

When building a network graph, an edge exists between a pair of base stations that are both visible to a common UE in the network, as defined herein. Thus, where a UE receives a suitable signal from two base stations, an edge exists between those two base stations. Where the UE receives a suitable signal from three base stations, BS1, BS2, and BS3 for instance, an edge exists between each pair of the three base stations (e.g., BS1-BS2, BS1-BS3, BS2-BS3), and so on. As is readily perceived, for large networks the computational complexity of resulting clustering algorithms can be very high (since complexity depends exponentially on the number of edges connected to a given node; see e.g., co-pending Patent Application 61/121,340 entitled "LIST ELIMINATION TO MITIGATE THE EFFECT OF LOOPS IN MESSAGE PASSING", incorporated by reference herein in its entirety). To mitigate this computational complexity, apparatus 100 can simplify complexity by pruning the number of edges employed in a clustering algorithm, as described herein.

Apparatus 100 can comprise a data processor 104 for executing the respective modules 106, 108, 110, 112. Specifically, an analysis module 106 is executed to estimate respective utilities for time t (e.g., a particular time slot or time subslot) of a set of local scheduling strategies generated by apparatus 100. Utility of respective scheduling strategies can be based on various objective metrics of wireless communication efficacy. In one example, utility can be derived from a throughput estimate for a particular mobile device. As another example, utility can be derived from a total throughput estimate (throughput cumulative density function [CDF])

for a set of mobile devices served by a base station, or a set of cooperative base stations. In yet another example, utility can be derived from a total throughput CDF estimated for mobile devices served by a subset of a network deployment. In still other examples, utility can be derived from other measures of wireless communication efficacy, such as data rate(s), path loss(es), SNR(s), etc., of one or more mobile devices, or a suitable combination of the foregoing. Analysis module 106 generates a file 106A of the utility estimates, stored in memory 102.

Once the utility estimates (106A) are derived, a parsing module 108 is executed to select a scheduling strategy for use by a base station coupled with apparatus 100 for time t. Selection can be based on highest utility, highest weighted utility (e.g., derived from a utility estimate and priority factor for a particular mobile device[s]), highest SNR, least interference, or some other suitable metric. Once determined, parsing module 108 generates a file 108A for the selected scheduling strategy, which is stored in memory 102.

A cooperation module 110 is executed to share utility information, strategy information, or a combination thereof, with other base stations via a backhaul link. Specifically, the selected strategy 108A or utility estimates 106A can be shared with the other base stations. It is contemplated that various backhaul links can be employed as part of the subject disclosure. In one instance, a wired backhaul link (e.g., Ethernet, coaxial cable, optical fiber, . . . ) can be employed. In another instance, a wireless backhaul link (e.g., WiFi connection, microwave connection, over-the-air [OTA] link employing a wireless repeater, one or more mobile devices, . . . ) can be employed. In still another instance, a combination of wired and wireless links can be employed for the backhaul link.

In addition to the foregoing, cooperation module 110 can receive utility or selected strategies from the other base stations. The received utility or strategy information can include information derived at, or originating from, those respective base stations, as well as information derived at/originating from other base stations, and passed to those respective base stations. As a particular illustrative example, consider a set of three base stations, B1, B2, B3. At a first time t, each base station generates utility estimates for local scheduling strategies and chooses a particular scheduling strategy based on the estimates. Each base station then shares this information with each of the other two base stations. Accordingly, after a first sharing iteration at time t, base station B1 has a utility estimate/strategy selection for base station B2, and for base station B3. Likewise, base station B2 has estimate/strategy information from base station B1 and B3, and base station B3 has estimate/strategy information from base station B1 and B2. At a second time t+1, each base station generates a second utility estimate and strategy selection, and aggregates the second estimate/strategy with the first estimates/strategies stored in memory. The aggregated file comprising three distinct records (e.g., two records from the first iteration at time t, and one record from the second iteration at time t+1) is then shared with each of its neighbor base stations. After this second iteration, each base station has nine records, three from the first iteration, and six from the second iteration. After successive iterations, the list of records can grow exponentially, even for this small three base station deployment.

To alleviate complexity in selecting scheduling strategies based on iterative information provided by neighboring base stations, apparatus 100 can comprise a pruning module 112. Pruning module 112 truncates aggregated utility or strategy information based at least in part on relevance to a strategy selected at current time iteration (e.g., time t). Optionally, pruning module 112 can be executed only after a certain number of scheduling iterations (e.g., 10 iterations, . . . ), or for a subset of scheduling iterations, to facilitate diversity in data collection. Relevance can be based on various factors in this context. In one example, redundant strategies, or strategies incompatible with local scheduling strategies of apparatus 100 can be deemed irrelevant and discarded. Of the remaining incoming strategies, iteration number, hop distance to an originating base station, network wide summed utility (NWSU) (e.g., as defined in Patent Application 61/121, 340), a measure of local utility (e.g., throughput for a particular base station), or the like, or a suitable combination thereof, can be utilized to determine relevance. Additionally, pruning module 112 can truncate aggregated utility or strategy information to a maximum number (e.g., P) of relevant records (e.g., where P is equal to or less than substantially 20 records, equal to or less than substantially 30 records, . . . ). As one particular example, pruning module 112 can generate a limited matrix from the truncated aggregated utility or strategy information by restricting a number of strategy selection records to the maximum number, and discarding strategy selection records above the maximum number. This truncated information can then be utilized to re-evaluate the strategy selection 108A, or utilized to limit processing overhead of subsequent strategy selections (e.g., at time t+1). In either case, truncation can be accomplished according to a particular set of rules stored in memory 102 that establish relevance of respective sets of strategies.

According to particular aspects of the subject disclosure, dynamic CoMP apparatus 100 implements dynamic scheduling according to the following example. First, a compatibility list is generated by referencing sets of incoming strategy selections/utility estimates. The size of the compatibility list depends on a number of messages Q passed at each edge, and a number N of edges coupled to apparatus 100. Additionally, a void strategy (no transmission in a timeslot) is analyzed. Accordingly in this example, the size of the compatibility list is $(Q+1)^N$ sets of strategies. Second, for each candidate local scheduling strategy $S_n$, where n is a positive integer, of a set of local scheduling strategies $\{S_1, S_2, \ldots, S_n, \ldots, S_m\}$ stored in memory 102, an optimal set of incoming strategies are chosen from the list. To this end, pruning module 112 can filter each of the $(Q+1)^N$ sets of strategies and eliminate all sets that are incompatible with the candidate local scheduling strategy $S_n$. As a particular example of this filtering, pruning module 112 discards strategy selection records having scheduling instructions that conflict with scheduling instructions of a local scheduling policy, and returns a subset of non-discarded strategy selection records with the local scheduling policy. Of the remaining sets, an aggregated matrix can be generated (e.g., see FIG. 6, infra) by appending all incoming strategy/estimate records included in the respective sets of strategies. Pruning module 112 can then further filter the aggregated matrix as follows. If two or more non-residual strategy records originating from a common base station exist (duplicate records), pruning module 112 retains the duplicate strategy selection record that has lowest hop distance (or highest NWSU as an alternative example), and discards other duplicate records of the set of duplicate records. If multiple duplicate records having the same hop distance exist, the record with highest utility (e.g., NWSU) is retained while others are discarded. Additionally, if two or more residual entries exist with a common strategy selection, the residual entry with highest utility is retained while the others are discarded. Further, pruning module 112 discards non-residual records originating from apparatus 100. In addition, placeholder records (e.g., having substantially zero utility, zero utility, . . . ) are discarded. After filtering records of respective sets of strategies, utility of each record is summed to generate an NWSU estimate for that set, and the set of strategies yielding the highest NWSU is saved with the candidate local strategy $S_n$. Other sets of strategies are discarded for that candidate local strategy. Further, the aggregated matrix is analyzed in this matter for each remaining local strategy.

To continue the foregoing example, once a set of received strategies is selected for each local strategy, messages can be evaluated by pruning module 112 with respect to potential cooperative base stations. To this end, the following operations are performed for each neighboring base station m. Among all candidate local strategies $S_n$, the local strategy that maximizes NWSU among all non-filtered incoming strategy/estimates that do not involve local base station n (the base station coupled with apparatus 100) is selected. This first selected local strategy is delegated a super-non-cooperative (SnC) strategy. Furthermore, among all candidate local strategies $S_n$, the strategy which maximizes NWSU among all cooperative strategies (involving both local base station n and at least one neighboring base station m) is selected, and designated the cooperative (C) strategy. Also, among all candidate local strategies $S_n$ other than the SnC and C strategies, Q-2 additional strategies are selected that maximize NWSU. As an alternative, once the first SnC strategy is determined, an additional number (e.g., P-1) of candidate local strategies $S_n$ can be selected from remaining local strategies (e.g., of the set $\{S_n\text{-SnC}\}$) based on highest NWSU. In this latter alternative, statistical preference between cooperative and non-cooperative strategies is mitigated.

Once determined, the SnC strategy, C strategy and Q-2 strategies are further evaluated based on a suitable table having a capped, or maximum, number P of received strategy records. For this further evaluation, Σ denotes a claimed strategy selected from the SnC, C or Q-2 strategies. For all Σ entries, residual and non-residual records involving destination node m are removed from the aggregated matrix, discussed above. Further, all records originating from node m are removed. If Σ is a non-cooperative strategy (e.g., not involving m), a record is appended to the aggregated matrix specifying utility of Σ, nodes involved in strategy Σ, and hop distance from the local base station to the base station originating strategy Σ. The appended, aggregated matrix is sorted according to ascending hop distance. If two or more records have the same distance, those records are sorted according to descending utility. The utilities of residual records are summed, and those residual records are discarded. If the remaining table is larger than size P-1, it is truncated to the first P-1 records, and the utilities of truncated records are added to the summed utility of the residual records. The residual sum is added to the last (P-th) available entry, along with an identifier (ID) of an originating base station, and the claimed strategy ($S_m$); further the strategy can increment a hop distance index of all records other than this last record by one (e.g., upon receiving a scheduling strategy from a base station that is directly adjacent to the local base station).

The foregoing example is one suitable manner to truncate received incoming strategy/estimate records to a maximum number of records (e.g., 20 records, 30 records, P records, . . . ). This example is presented for illustrative purposes, and is not intended to limit the scope of the subject disclosure. Rather, other examples made known to one of skill in the art by way of the context provided herein are contemplated as part of the subject disclosure.

Figure 2:
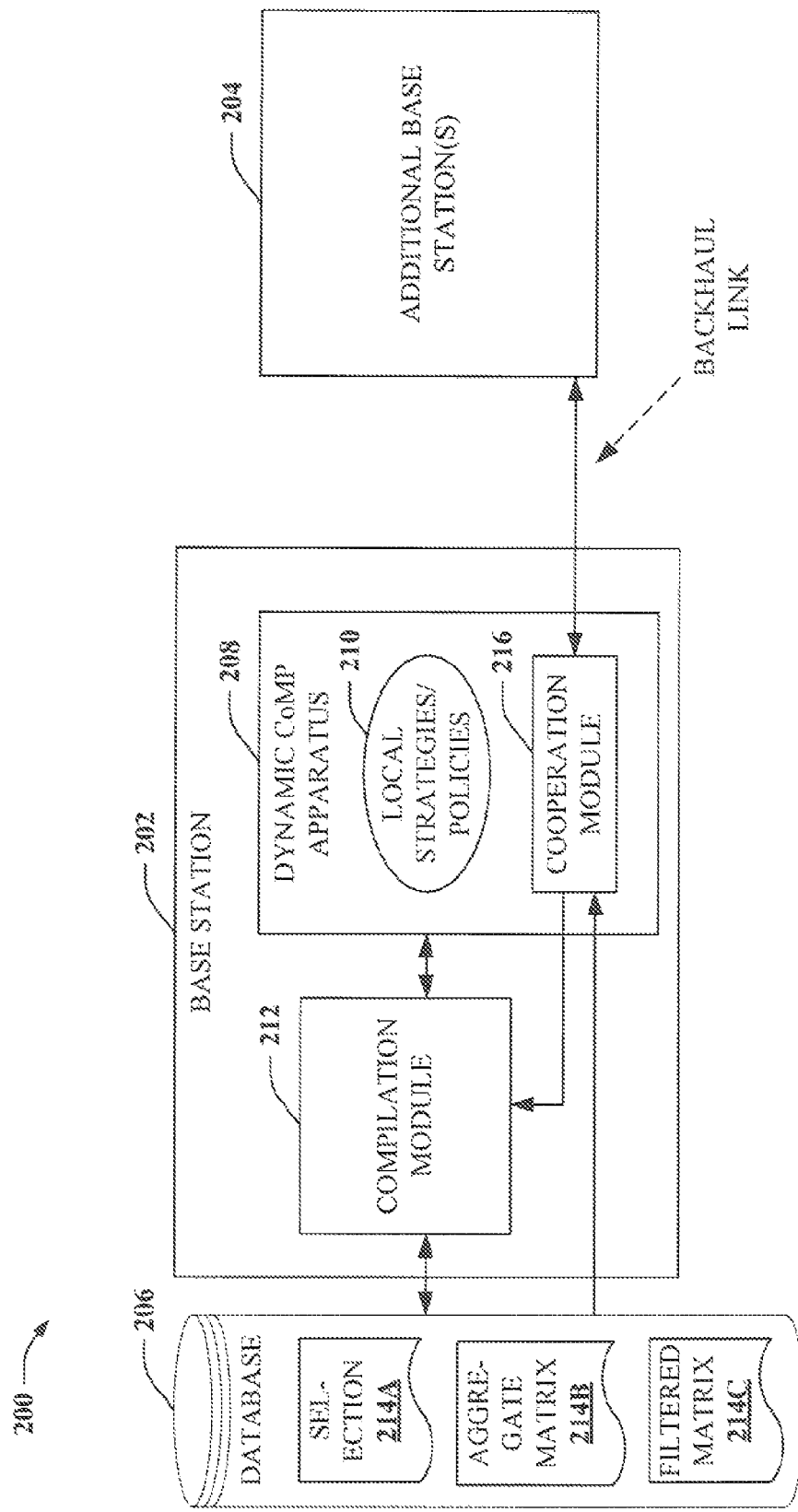
FIG. 2 depicts a block diagram of a sample wireless arrangement for distributed CoMP wireless communication according to aspects of the subject disclosure.

FIG. 2 illustrates a block diagram of an example distributed dynamic CoMP wireless communication arrangement 200 according to aspects of the subject disclosure. Wireless communication arrangement 200 comprises a base station 202 communicatively coupled with at least one additional base station 204 via a backhaul link. Additionally, base station 202 comprises a database 206 for storing and managing scheduling strategy and utility estimate records obtained pursuant to the distributed dynamic CoMP wireless communication. As depicted, base station 202 comprises a dynamic CoMP apparatus 208 configured to conduct distributed dynamic CoMP for base station 202. This distributed dynamic CoMP can include generating local scheduling strategies/policies 210 for a dynamic mobile topology (not depicted) served by base station 202, selecting a particular strategy at time t based on network utility estimates of respective scheduling strategies 210, and sharing these selections/estimates with additional base station 204. Further, dynamic CoMP apparatus 208 can obtain similar selections/estimates there from, at successive time iterations (t, t+1, t+2, . . . ).

Scheduling strategy selections made by dynamic CoMP apparatus 208 are stored by a compilation module 212 in a selection file 214A at database 206. Furthermore, compilation module 212 organizes the selection file 214A (e.g., a strategy selection record) into a table or matrix (e.g., see FIG. 6, infra), comprising entries for past strategy selections (e.g., at times t-A, . . . , t-2, t-1) generated by dynamic CoMP apparatus 208. In addition, compilation module 212 can organize a strategy selection record to include an ID of base station 202 (e.g., a base station originating the selection file 214A), respective utility estimates, and IDs of other base stations (204) required to participate in a selected strategy in conjunction with respective strategy selections.

A cooperation module 216 provides strategy selection data appended to selection file 214A (as well data previously generated for the filtered matrix 214C—see below) to additional base station(s) 204 over the backhaul link. Furthermore, cooperation module 216 receives similar strategy selection data from additional base station(s) 204, and forwards the received data to compilation module 212, which appends the received data to an aggregate matrix file 214B. This received strategy selection data includes strategy selections and utility estimates generated by additional base station(s) 204, as well as other such records received by additional base station(s) 204 from base station 202 and various other base stations (not depicted). Accordingly, the received strategy selection data can include duplicate records, or records that are duplicates of other records stored in selection file 214A or aggregate matrix 214B. Moreover, the received strategy selection data can contain records that are incompatible with a strategy selection made by dynamic CoMP apparatus 208 (e.g., a cooperative strategy involving additional base station 204 and base station 202 will be incompatible with a non-cooperative strategy, and vice versa), as well as records that are/were incompatible with strategy selections made by additional base station(s) 204.

In one aspect of the subject disclosure, additional base station(s) 204 can pass unfiltered strategy selection/utility estimate data to cooperation module 216. In an alternative aspect, additional base station(s) 204 can pass strategy/estimate data that is pre-truncated (e.g., to a maximum of P records). In yet another aspect, additional base station(s) 204 can pass pre-filtered strategy/estimate data, which is optionally also truncated to P records. This pre-filtered data can be stripped of duplicate or incompatible (with respect to strategies selected by additional base station(s) 204) records, for instance. Furthermore, the pre-filtered data can be sorted with respect to relevance (based on hop distance or estimates utility with respect to additional base station(s) 204), and truncated to include only a number P of the most relevant records (again with respect to additional base station(s) 204).

After each message passing iteration, compilation module 212 can manage data stored in aggregate matrix 214B and generate a filtered matrix 214C. This filtered matrix 214C can be utilized to re-evaluate a current strategy selection of dynamic CoMP apparatus 208 (e.g., the most recent strategy selection saved to file 214A). This re-evaluation can be utilized, for instance, to determine compatibility between current strategy selections of base station 202 and additional base station(s) 204. To generate filtered matrix 214C, compilation module can employ various filtering methods described herein. Such methods can comprise identifying and discarding duplicate records (e.g., based on ordered hop distance or utility), identifying and discarding incompatible records, or truncating the aggregate matrix 214B to a maximum number of the most relevant records (e.g., based on hop distance or utility, optionally after discarding duplicate or incompatible records). As a particular example, truncating the aggregate matrix 214B can comprise prioritizing policy selection records, numbering the policy selection records starting from high to low priority, and discarding policy selection records numbered higher than the record maximum.

Once generated, the filtered aggregate matrix can be stored at filtered matrix file 214C (optionally overwriting previous iterations of this file). The filtered matrix (214C) can then be employed for re-evaluating a current strategy selection (214A), or for subsequent strategy selection iterations at subsequent times. In at least one aspect, re-evaluation can comprise checking compatibility of the current strategy selection (214A) with current strategy selection(s) of additional base station(s) 204. If compatible, base station 202 and additional base station(s) 204 can elect to cooperate for downlink CoMP transmission for one or more mobile devices, as specified by the respective strategy selections. Otherwise, base station 202 or additional base station(s) 204 can revert to a void strategy (e.g., transmit no downlink data for time t), or a non-cooperative strategy, or another suitable default scheduling strategy.

Figure 3:
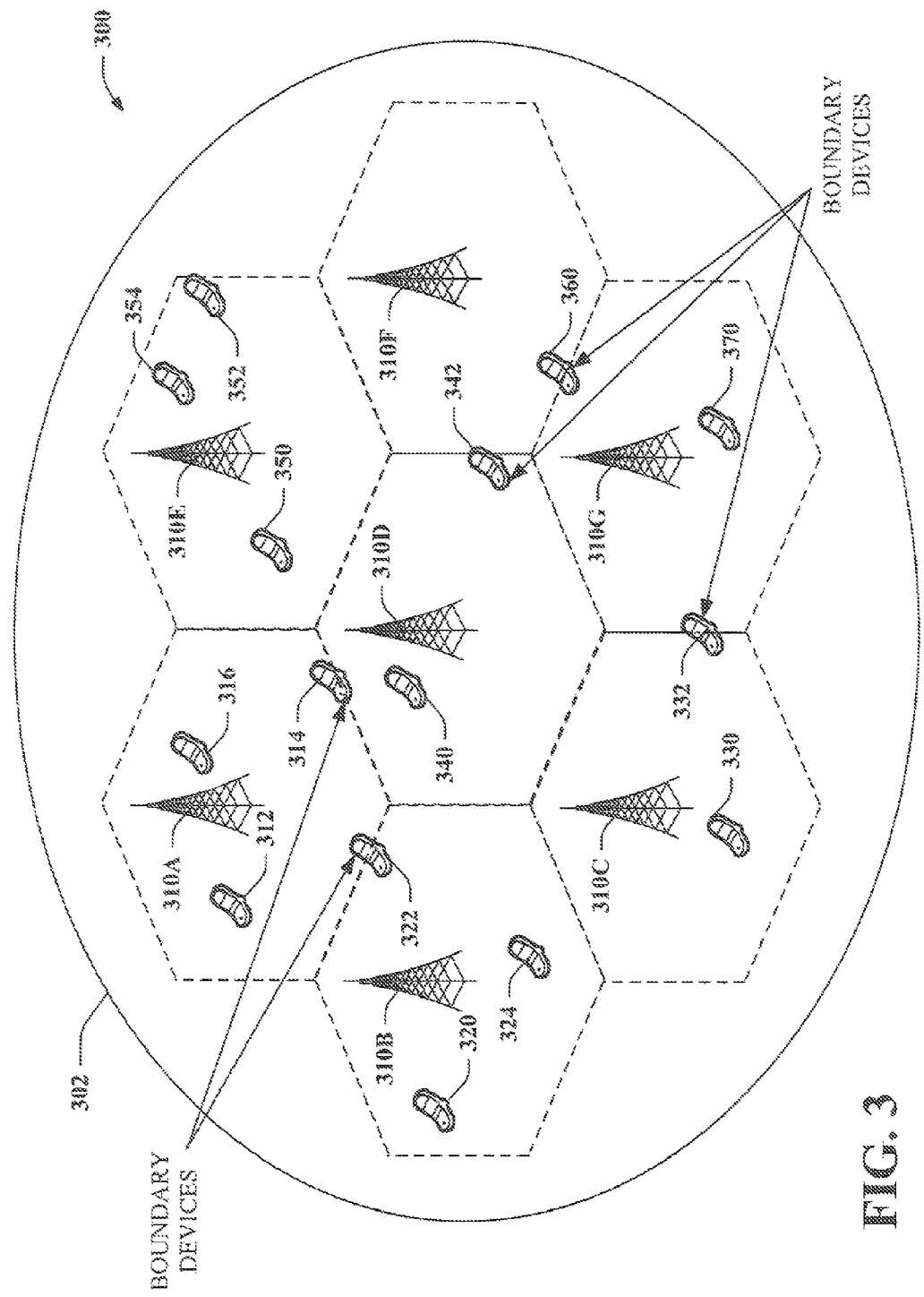
FIG. 3 illustrates an example wireless arrangement suitable for CoMP communication according to further aspects.

Turning now to FIG. 3, an example conventional wireless deployment 300 is depicted, having several base stations 310A, 310B, 310C, 310D, 310E, 310F, 310G (referred to collectively as 310A-310G). Each of the base stations 310A-310G is associated with a default coverage area or cell; in this case based on a hexagonal layout. Various mobile devices (312, 314, 316, 320, 322, 324, 330, 332, 340, 342, 350, 352, 354, 360, 370—referred to collectively as 312-370) can move in and out of the wireless deployment 300, and in and among the respective cells of the several base stations 310A-310G. These mobile devices 312-370 are visible to different base stations 310A-310G at different times, as defined herein, providing a variable network topology for each base stations 310A-310G. Typically, efficacy of wireless communication is greatest for those mobile devices 312-370 that are well within the boundaries of a particular cell (hexagonal layout). As a mobile device (312-370) nears a cell boundary between two base stations (310A-310G), the mobile device observes increasing downlink interference from a neighboring cell, and in turn causes increasing uplink interference to that neighboring cell.

Cooperative strategies can be employed to mitigate interference among cells, as well as improve communication throughput, as compared with non-cooperative wireless communication. For instance, with regard to interference, if two or more base stations cooperate to serve a mobile device in a given time subslot, little to no interference is observed by that mobile device from any of the cooperating cells in that subslot (e.g., because each cell is cooperating to transmit common streams of data to the mobile device). Furthermore, two or more cooperating base stations can simulate a MIMO system (e.g., where a single base station employs two or more antennas to transmit multiple copies of a data stream) and achieve throughput gains associated with such a system. Thus, utility estimates based on throughput or data rate are typically larger for cooperative strategies.

Despite the potential throughput gains and interference benefits of cooperative strategies, implementation of such strategies may need to be mitigated to ensure fairness among respective mobile devices (312-370). Allocating resources to maximize throughput for any given mobile device in cooperative systems can result in multiple other mobile devices receiving inordinately few resources, negatively affecting their throughput. Likewise, algorithms that maximize throughput for a set of mobile devices can result in an overall strategy in which one or more devices consistently obtain few resources, even though total throughput for the set of mobile devices is maximized. This can lead to poor mobile experience for negatively affected users. Accordingly, utility metrics described herein can include both performance and fairness factors in determining maximum utility.

As depicted, several mobile devices (312-370) are located on or near a cell boundary between two base stations (310A-310G). Specifically, mobile device 314 is on a boundary between base stations 310A and 310D, mobile device 322 is on a boundary between base stations 310A and 310B, mobile device 342 is on a boundary between base stations 310D and 310F, mobile device 360 is on a boundary between base stations 310F and 310G, and mobile device 332 is on a boundary between base stations 310C and 310G. Typically, an active set of mobile devices (312-370) visible to a base station (310A-310G) is communicated among the base station's neighbors. By measuring received SNR, a base station can estimate distance to a mobile device and compare that distance to a known cell boundary (e.g., 500 meters). For mobile devices (312-370) determined to be at a cell boundary, a base station (310A-310G) can further reference active sets of neighboring base stations (310A-310G) to identify the particular cell boundary. As an example, base station 310D can determine that mobile device 342 is near a cell boundary based on estimated distance. By reference neighboring base stations (310A, 310B, 310C, 310G, 310E, 310F), it can also be determined that mobile device 342 is near a boundary of cell 310F, and possibly near a boundary of cell 310G as well.

Based on this topology, base station 310D can analyze a set of local scheduling policies or strategies for mobile device 342, considering non-cooperative policies, policies involving cooperation with base station 310F, policies involving cooperation with base station 310G, or policies involving cooperation with both base station 310F and 310G. Likewise, each respective base station 310A-310G can analyze a set of scheduling policies for visible mobile devices. For a distributed dynamic CoMP arrangement, the base stations 310A-310G can select non-cooperative or cooperative strategies that maximize overall throughput of the deployment 300, and dynamically form base station clusters to achieve the cooperative strategies. Moreover, these strategies and clusters can vary over time to meet the changing mobile device topology. In such a manner, deployment 300 can provide a CoMP service environment that is as flexible as the mobile topology itself, and optimized for the whole deployment 300. One example is described in more detail at FIG. 4, below.

FIG. 4 illustrates a sample dynamic cooperative deployment 400 comprising a subset 402 of a wireless network, according to particular aspects of the subject disclosure. Deployment 400 can comprise an arrangement of wireless network base stations 310A-310G and a dynamic topology of mobile devices 312-370 substantially similar to that described supra at FIG. 3. For purposes of this sample deployment 400, it is assumed that the dynamic topology of mobile devices 312-370 represents a snapshot in time of the respective positions of such devices.

As depicted, deployment 400 comprises clusters of base stations 404A, 404B, 404C, 404D (referred to collectively as 404A-404D) formed for the current topology 312-370. The clusters 404A-404D include cooperative and non-cooperative clusters. For instance, base stations 310C and 310E have selected non-cooperative clusters 404B and 404D, respectively, in which these base stations 310C, 310E act alone to serve mobile devices in their respective cells (devices 330, 332 and 350, 352, 354). Likewise, base stations 310A, 310B, 310D and 310F, 310G have selected cooperative clusters 404A and 404C, respectively.

For each of the cooperative clusters, at least one mobile device is served by multiple base stations in a current time t. Typically, cooperative arrangements will include mobile devices on a boundary between two or more cells, as CoMP communication requires at least minimum signal power levels to be observed at each of the participating base stations. Accordingly, cooperative cluster 404A could involve cooperation between base station 310A and 310D to serve mobile device 314, or cooperation between 310B and 310A, 310B and 310D, or 310A, 310B and 310D to serve mobile device 322. Likewise, cooperative cluster 404C could involve cooperation between base stations 310F and 310G to serve mobile device 342, 360, or both. For mobile device 332, eligible base stations 310C and 310G have elected to form a non-cooperative relationship at least for time t. This relationship might result for a variety of reasons. For instance, an incompatibility might exist between scheduling strategies selected by base station 310C and 310G, respectively. Alternatively, cooperation between 310G and 310F might yield higher overall throughput for deployment 400 than cooperation between 310G and 310C. Further, a combination of the foregoing reasons might result in this non-cooperative strategy.

It should be appreciated that the depicted clusters 404A-404D can change as the mobile device topology (312-370) changes. For instance, as mobile devices 312-370 enter, leave and move within the subset of the wireless network 402, efficiency and compatibility of clustering can change, resulting in changes to the number or composition of clusters 404A-404D, as described herein. Furthermore, as traffic priority of respective devices 312-370 changes (e.g., as devices initiate/terminate voice calls, data sessions, . . . ), respective utility estimates can change, resulting in a different combination of strategy selections and cooperative/non-cooperative arrangements maximizing utility for the deployment 400. Furthermore, the strategy/record pruning techniques described herein enable respective base stations 310A-310G to reduce processing times involved in selecting such strategies and adapting to changing topology. Accordingly, the subject disclosure can effectuate improved dynamic clustering, over smaller iterations of time (e.g., on a subslot scale rather than a time slot scale).

Figure 5:
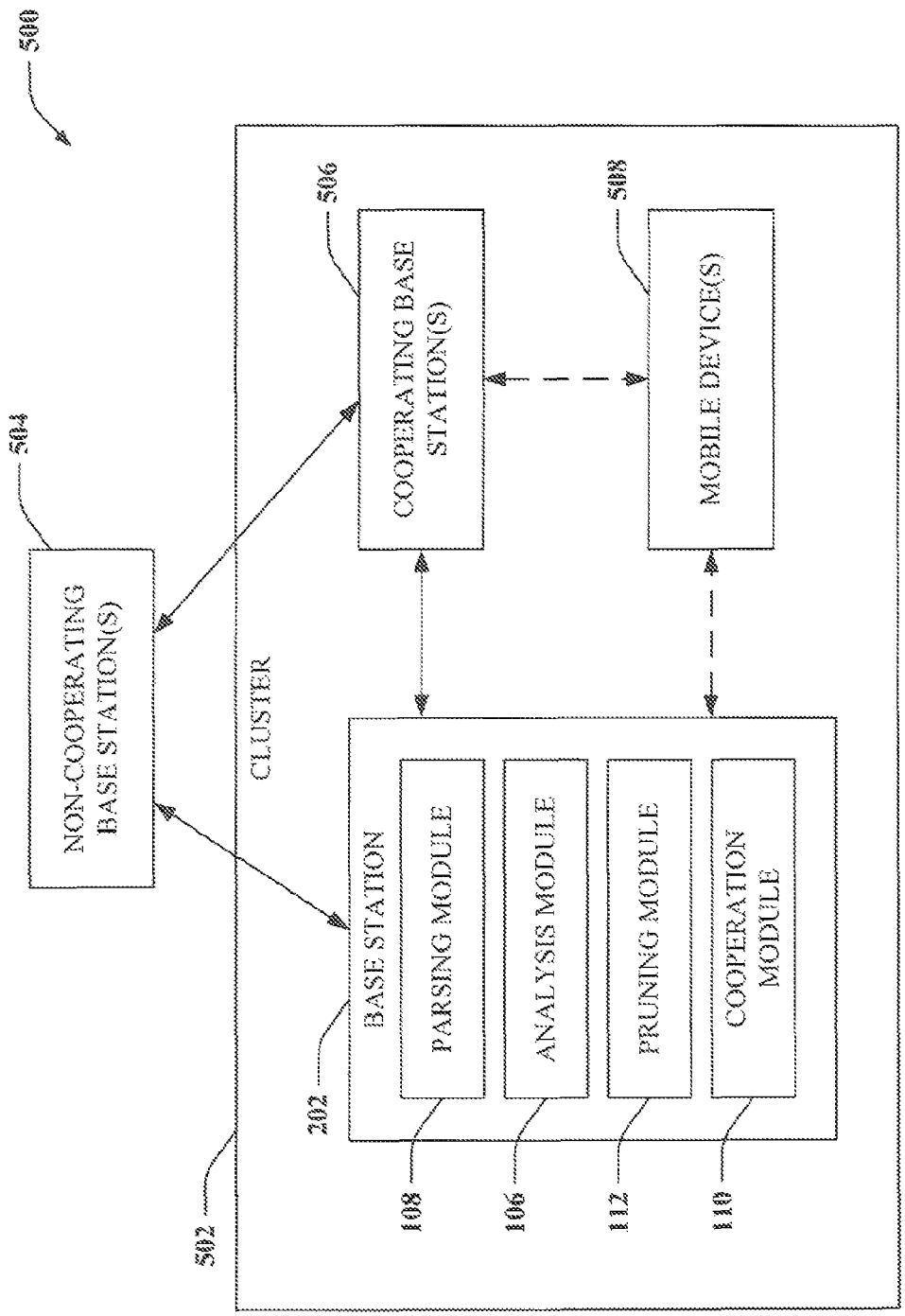
FIG. 5 depicts a block diagram of an example distributed dynamic base station cluster suitable for implementing CoMP wireless communication.

FIG. 5 illustrates a block diagram of an example system 500 depicting operation of cooperative and non-cooperative scheduling strategies in a dynamic CoMP environment according to aspects of the subject disclosure. System 500 includes base station 202, cooperating base station(s) 506, and non-cooperating base station(s) 504 (e.g., cooperating base station(s) 502 and non-cooperating base station(s) 504 can each be substantially similar to base station 202, . . . ). For instance, cooperating base station(s) 506 and non-cooperating base station(s) 504 can be one or more of the disparate base stations 310A-310G depicted at FIG. 3 or 4. As described herein, at a given time t, base station 202 and cooperating base station(s) 506 can dynamically form a cluster 502. Thus, base station 202 and cooperating base station(s) 506 can cooperate with each other at the given time; meanwhile, at the given time, base station 202 and cooperating base station(s) 506 do not cooperate with non-cooperating base station(s) 504. Moreover, non-intersecting subsets of non-cooperating base station(s) 504 can similarly form respective, non-overlapping clusters (clusters having no identical base stations—see FIG. 4, supra) in which cooperation can be effectuated. Further, cluster 502 can include mobile device(s) 508, which are served by base station 202 and cooperating base station(s) 506. Likewise, although not shown, system 500 can include mobile devices not included in cluster 506 that are each covered by a respective one of the non-overlapping clusters dynamically formed by the non-cooperating base station(s) 504 at time t.

As described herein, base station 202 can leverage parsing module 108, analysis module 106, and cooperation module 110 to dynamically analyze respective local scheduling strategies of base station 202, and select an optimal strategy that maximizes estimated utility, as described herein. In particular aspects of the subject disclosure, the analysis and selection can be derived from a matrix of filtered sets of scheduling strategies received from non-cooperating base station(s) 504 and cooperating base station(s) 506. In addition to the foregoing, cooperation module 110 can effectuate additional message passing between base station 202 and cooperating base station(s) 506 once cluster 502 is formed. This additional message passing can include exchanging shared data packets for downlink CoMP transmission, coordinating timing for such transmissions, sharing reverse link feedback pertaining to the transmission, and so on. In effect, typical operation of a multi-antenna MIMO arrangement orchestrated at a single base station can be facilitated across multiple base stations (202, 506) via cooperation module 110 and a backhaul link to the cooperating base station(s) 506.

Figure 6:
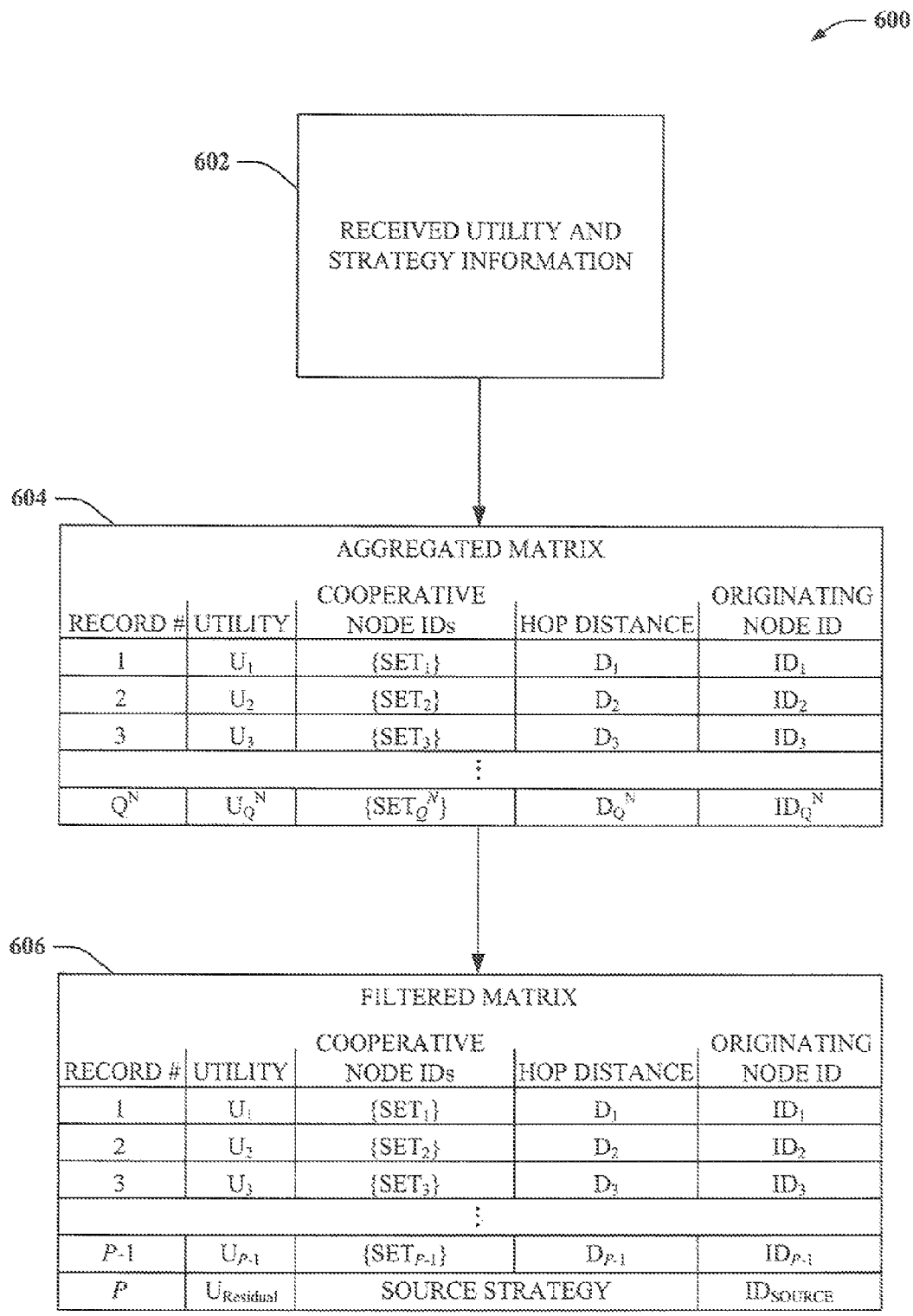
FIG. 6 illustrates a block diagram of a filtered utility and scheduling matrix for improving overhead in distributed dynamic CoMP wireless communication.

FIG. 6 illustrates a diagram 600 of scheduling strategy information suitable for conducting dynamic cooperative CoMP wireless communication among a set of base stations. Particularly, the strategy scheduling information comprises information 602 obtained from neighboring network nodes pertaining to current or previous distributed strategy decisions. These strategy decisions can originate at the respective nodes providing the information, or can merely be passed along by the nodes providing the information from other nodes of a wireless network (the latter of which can include a receiving node as well). Furthermore, the information 602 can include strategies selected at time t or at previous times (e.g., t−A, . . . , t−2, t−1). In conjunction with the respective strategies, information 602 can include IDs of nodes originating the selections, IDs of nodes participating in respective selections, utility estimates of respective selections, hop distance from an originating node, or the like, or a combination thereof.

A number Q of messages (602) can be exchanged on each edge between two adjacent base stations (e.g., where a single base station has one edge for each adjacent base station), resulting in $Q^N$ messages 602 received at each node for each iteration of message passing. Strategy selection records in the $Q^N$ messages are appended to an aggregated matrix 604 at successive message passing iterations. Accordingly, aggregated matrix 604 can comprise a master record of received utility and strategy information 602 for all times T (or a subset of times, corresponding with respective initializations of distributed dynamic communication in a wireless deployment, or region thereof). This master matrix (604) will have a number of records equal to $Q^N$ times the number of iterations appended to this master matrix (604).

From the aggregated matrix 604, a filtered matrix 606 can be generated. The filtered matrix can be derived according to various pruning mechanisms, described herein. For instance, the filtered matrix can be derived by identifying and removing records of the aggregated matrix 604 that are incompatible or inconsistent with (e.g., conflict with) a particular local scheduling strategy of a local node. Alternatively, or in addition, redundant records in the aggregated matrix 604 can be identified and a subset thereof discarded. In addition, remaining records of the aggregated matrix 604 can be truncated to a maximum number of records, P, with priority given to records having lower hop distance, higher utility estimates, or some other suitable relevance metric, or a combination thereof. As an alternative, where a residual record is appended to filtered matrix 606, remaining records of aggregated matrix 604 can be truncated to P-1 records, and a residual record and corresponding associated data appended to a Pth record. Records can then optionally be sorted according to utility, hop distance, etc., as described above.

As described herein, multiple iterations of filtered matrix 606 can be generated for different local scheduling strategies of a local node. Respective iterations (606) of the filtered matrix can be saved in temporary memory with their respective candidate strategies. Once an optimal strategy is selected, the associated filtered matrix iteration (606) can be saved to a master filtered matrix file 606. An additional record can then be appended to the master file 606, based on the selected optimal strategy.

According to some aspects of the subject disclosure, to decrease the size of messages passed as part of dynamic distributed wireless communication, filtered matrix 606 is exchanged between base stations, to limit received utility and strategy information 602 at least to those records found relevant to a strategy selection of a neighboring base station. It can be assumed that these messages based on a filtered matrix (606) can also be relevant to a recipient base station, since the recipient will typically be involved in coordinated scheduling strategies employed by the passing base stations, and vice versa. Accordingly, employing the filtered matrices (606) should retain information enabling convergence to a maximum NWSU, and can significantly enhance the speed of such convergence in at least some instances.

The aforementioned systems and apparatuses have been described with respect to interaction between several components, modules and/or communication interfaces. It should be appreciated that such systems and apparatuses can include those components/modules or sub-modules specified therein, some of the specified components/modules or sub-modules, and/or additional modules. For example, a system could include dynamic CoMP apparatus 100, base station 202, and database 206, or a different combination of these or other modules. Sub-modules could also be implemented as modules communicatively coupled to other modules rather than included within parent modules. Additionally, it should be noted that one or more modules could be combined into a single module providing aggregate functionality. For instance, compilation module 212 can include cooperation module 216, or vice versa, to facilitate analyzing wireless signal timing information and verifying the analysis by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 7:
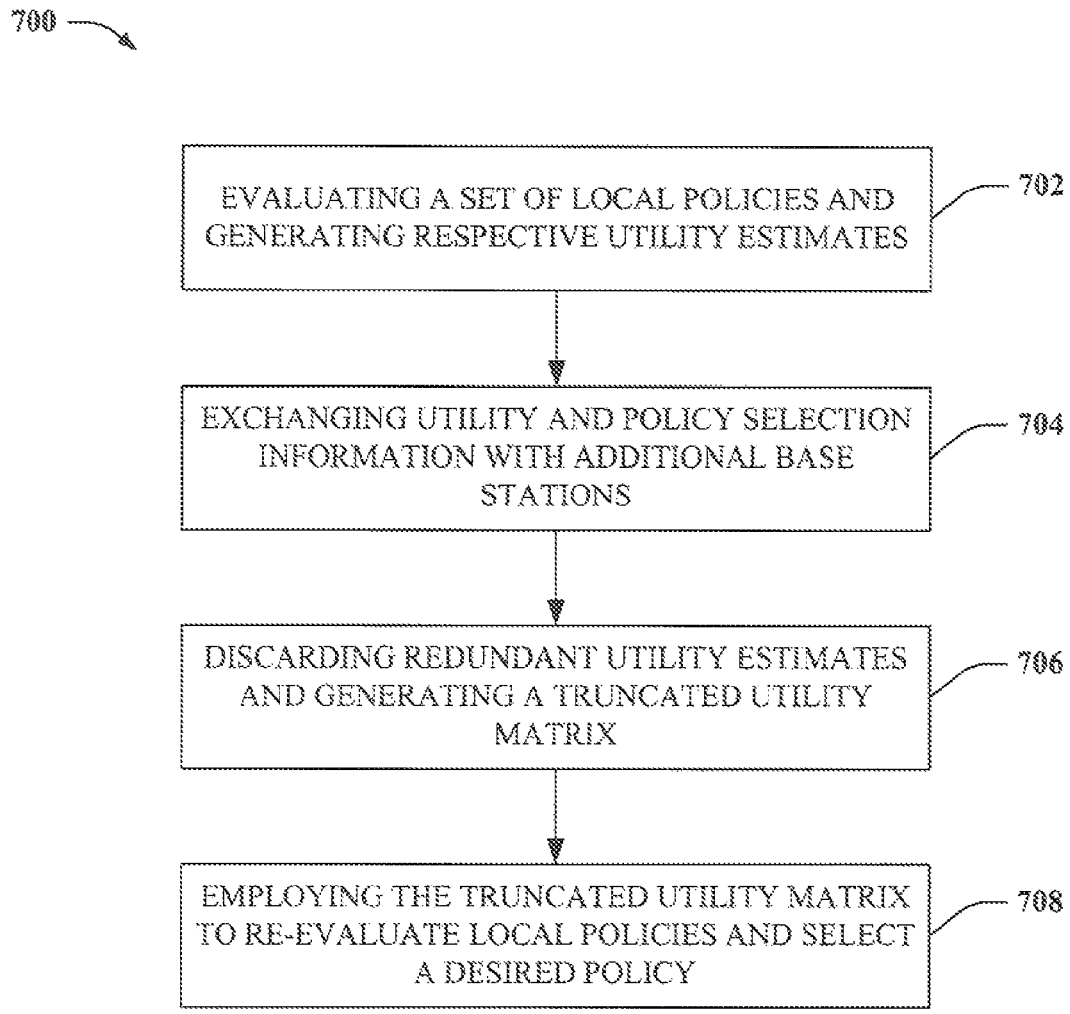
FIG. 7 illustrates a flowchart of an example methodology for providing improved distributed dynamic CoMP wireless communication according to some aspects.
Figure 8:
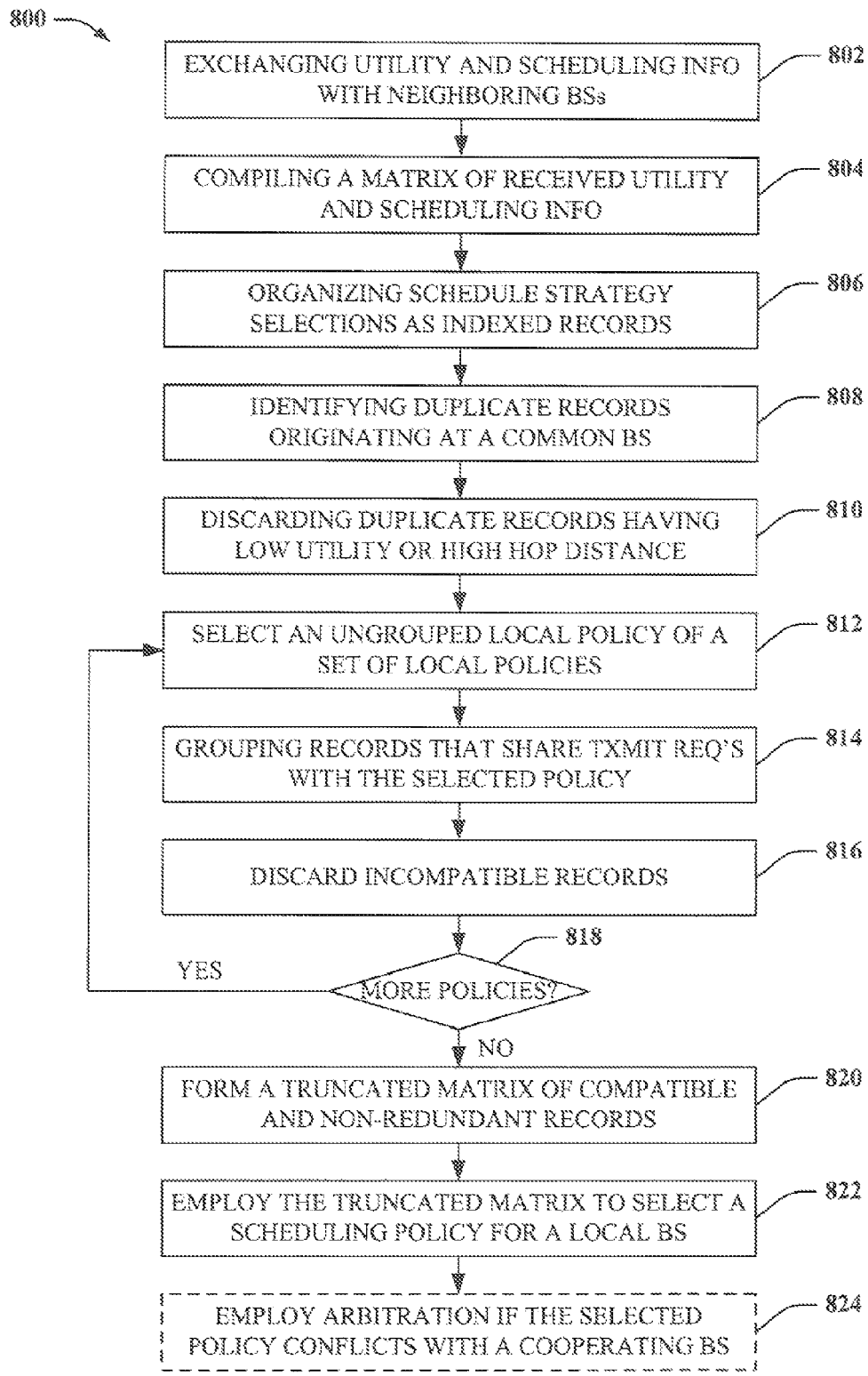
FIG. 8 depicts a flowchart of an example methodology for improving overhead in distributed dynamic CoMP wireless communication.
Figure 9:
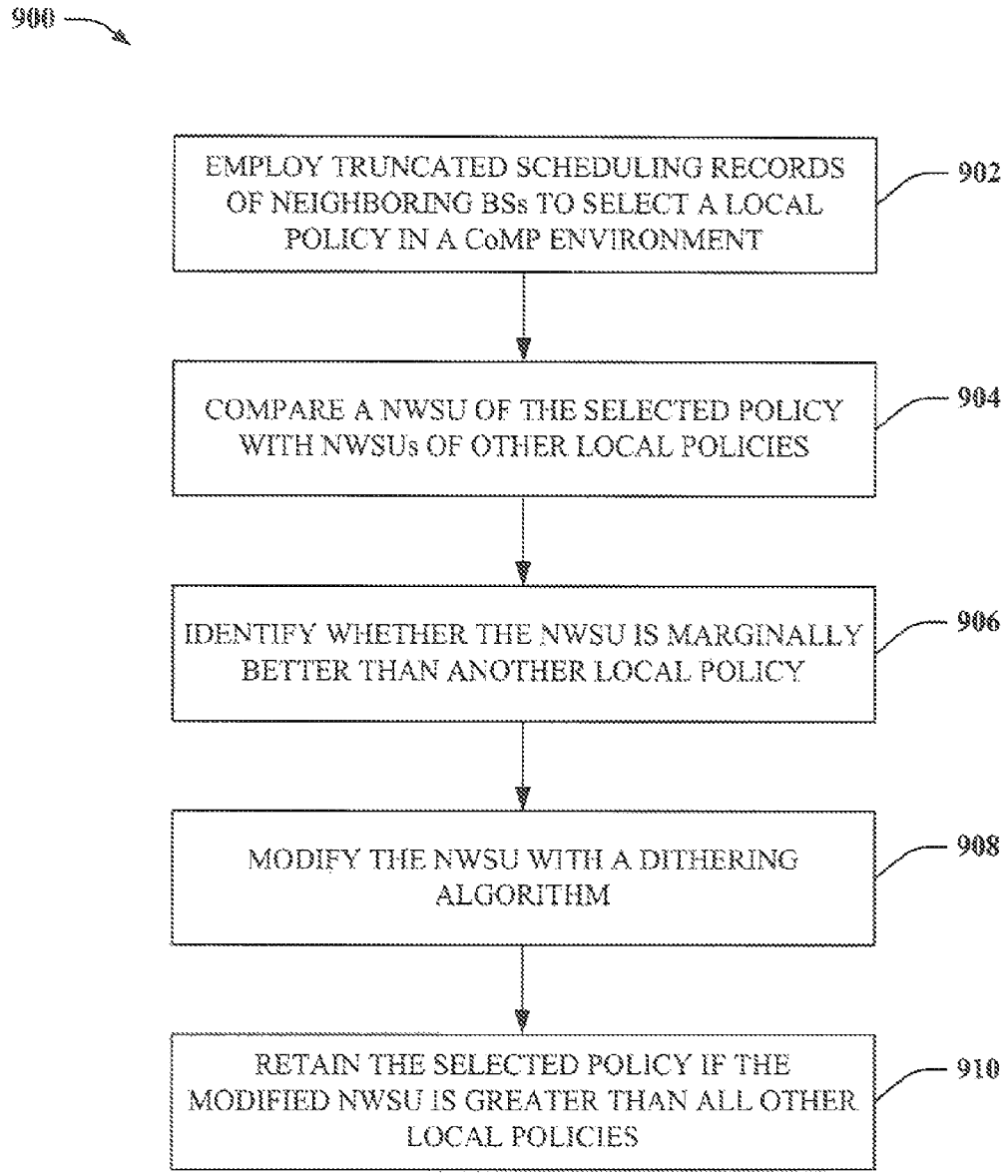
FIG. 9 depicts a flowchart of a sample methodology for providing randomization for strategy selection in distributed dynamic CoMP communication.

In view of the exemplary systems described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

FIG. 7 depicts a flowchart of an example methodology 700 according to particular aspects of the subject disclosure. At 702, method 700 can comprise evaluating a set of local scheduling policies (or local policies, which can include the schedule strategies described herein) for a base station and generating a network utility estimate for respective policies of the set. The evaluating can comprise comparing respective local policies with a current mobile topology associated with the base station. In addition, the network utility estimate can be a summed utility of selected policies for each mobile device within the current mobile topology. In at least some aspects of the subject disclosure, the evaluating can be based at least in part on information obtained from neighboring base stations in prior iterations of method 700.

At 704, method 700 can comprise exchanging utility and policy selection information with a set of additional base stations. Particularly, the shared information can comprise the summed utility for the mobile topology, the selected strategy, base stations involved in the selected strategy, or ID of the base station originated the strategy selection. For non-cooperative strategies, the ID of base stations involved in the selected strategy will be only the ID of the originating base station. For cooperative strategies, the involved base stations will include the originating base station and at least one base station sharing an edge with that originating base station. Furthermore, in at least one aspect, multiple overlapping cooperative strategies can be involved (e.g., in conjunction with fractional re-use within a particular time slot of subslot) with different groups of base stations. In this case, the selected strategy can have multiple groups of participating base station IDs (for each respective group), each group including at least the originating base station ID. Further to the above, as is described herein, exchanging utility and policy selection information can further comprise receiving utility and policy selection information in one or more messages from one or more of the additional base stations.

At 706, method 700 can comprise identifying a redundant utility estimate from the received utility information and generating a truncated network utility matrix that excludes the redundant utility estimate (e.g., wherein the redundant utility estimate comprises multiple reports of a policy selection of a signal network node). Alternatively, or in addition, method 700 can identify a policy selection from the received information that is incompatible with the utility estimate generated at reference number 702, and form the truncated network utility matrix to exclude the incompatible utility estimate (e.g., by rejecting incompatible policies or utility estimates).

At 708, method 700 can comprise employing the truncated network utility matrix to re-evaluate the subset of local policies. As a result of the re-evaluation, method 700 can select a desired policy that at least maximizes a NWSU estimate for a wireless network. As described, method 700 can facilitate improved efficiency in distributed dynamic CoMP wireless communication, by reducing an amount of data required to process local policy selections for the CoMP communication. Accordingly, distributed clustering decisions can be implemented more efficiently, allowing the wireless network to quickly adapt to changing mobile topology, while converging to a utility estimate that maximizes NWSU.

FIG. 8 illustrates a flowchart of another example methodology 800. Method 800 can be implemented to alleviate processing overhead in distributed CoMP systems, as follows. At 802, method 800 can comprise exchanging utility and scheduling policy information with neighboring base stations. At 804, method 800 can comprise compiling a matrix of received utility and scheduling information. The matrix can be compiled from information exchanged in a current information exchange, or can be appended to information exchanged in one or more previous information exchanges.

At 806, method 800 can comprise organizing scheduling policy selections as indexed records. The indices can associate respective numbers with respective records. In addition, the indexed records can be referenced with respect to additional information associated with the scheduling policy selections, including estimated utility of such selections, nodes participating in the selections, originating node, hop distance from the originating node, or the like.

At 808, method 800 can comprise identifying duplicate records originating at a common base station. At 810, method 800 can comprise discarding or eliminating a subset of the duplicate policy selection records having low utility or high hop distance. In some aspects, eliminating duplicate policy selections can comprise retaining a non-residual policy selection having smallest hop distance, eliminating a residual policy selection that does not have highest utility between two or more identical residual policy selections, eliminating a non-residual policy selection that originates with the common base station, or eliminating policy selections having utility of zero or substantially zero. At 812, method 800 can further comprise selecting an ungrouped local policy of a set of local policies. At 814, method 800 can group the selected local policy with sets of policy selection records from the matrix of received utility and scheduling information that are compatible with the selected local policy. At 816, method 800 can comprise discarding sets of records that are incompatible with the selected local policy (e.g., that require cooperation with base stations not included in the selected local policy).

At 818, method 800 can determine whether more ungrouped local policies exist within the set of local policies. If more such local policies exist, method 800 can return to reference number 812. Otherwise, method 800 proceeds to 820.

At 820, method 800 can comprise forming a truncated matrix of policy records for respective local policies. The truncated matrix can comprise compatible and non-duplicate sets of policy selection records grouped with the respective local policies. In at least one aspect of the subject disclosure, method 800 can comprise limiting a number of policy selection records in the truncated network utility matrix to a record maximum number (e.g., P) of policy records. In such aspect(s), compatible and non-duplicate sets of policy records can be ordered with respect to relevance to the respective local policy, where relevance can be determined from highest summed utility, least hop distance, or the like. Further, forming the truncated matrix optionally can comprise numbering the policy selection records starting from high to low priority, discarding least relevant policy selection records numbered higher than the record maximum (e.g., over the maximum number) the truncated matrix. In at least one aspect, forming the truncated matrix can further comprise eliminating a non-residual policy selection that originates with a local base station.

At 822, method 800 can comprise employing the truncated matrix to select a scheduling policy for a local base station. For instance, the selected scheduling policy can be identified from compatible non-cooperative local policies, compatible cooperative policies, and compatible policies of a superset of cooperative and non-cooperative policies. Specifically, the scheduling policy can be identified as the policy of the respective sets of local policies that achieves maximum NWSU for a wireless network. Optionally, at 824, method 800 can employ arbitration if the scheduling policy selected for the local base station cannot be implemented via voluntary distributed clustering; for instance, where a cooperative strategy requires participation from a neighboring base station that elects not to cooperate with the local base station. In such case, arbitration can provide a default policy to overcome failed implementation. In one aspect, the default policy can comprise a void policy, causing the local base station to blank or cancel transmissions in a particular time slot or subslot associated with the desired local policy. In another aspect, the default policy can comprise a non-cooperation strategy, causing the local base station to serve visible mobile devices without cooperative multipoint links. In other words, the non-cooperation strategy can cause the local base station to exit the dynamic CoMP cluster for a time slot and serve a user equipment not served by selected policies of neighboring base stations.

FIG. 9 depicts a flowchart of a sample methodology 900 according to still other aspects of the subject disclosure. Method 900 can introduce fairness in utility maximization algorithms employed for selecting cooperative or non-cooperative local scheduling policies. As one example, method 900 can comprise adding a random or pseudo-random noise term to selecting such policies and selecting the desired local policy only if utility of the local policy plus the noise term is greater than utility of another local policy. Employing the noise term can mitigate overuse over a particular policy that provides poor throughput to a particular mobile device, despite maximizing throughput for a network deployment.

At 902, method 900 can comprise employing a truncated scheduling record of neighboring base stations to select a local policy in a distributed CoMP environment, as described herein. Furthermore, at 904, method 900 can comprise calculating NWSU for policy selections and comparing a NWSU of the selected policy with NWSU estimates of other candidate local policies. For instance, where the selected policy is from a group of policies that respectively maximize NWSU of sets of cooperative strategies, sets of non-cooperative strategies, and a subset of policies that maximize NWSU for all strategies, the NWSU of the selected policy can be compared with the policy(ies) that maximize the respective cooperative, non-cooperative and inclusive sets. At 906, method 900 can comprise identifying the policy selection having highest NWSU and further identifying whether the NWSU is only minimally better than NWSU of another local policy (e.g., respective NWSU estimates can be deemed minimal if within 0.50, 1.0%, or some other suitable small value). At 908, method 900 can modify the NWSU of the selected policy with a random or pseudo-random dithering algorithm. An example of such an algorithm can comprise a zero-mean real Gaussian, with a suitable standard deviation (e.g., of 0.10, 0.25, . . . ). At 910, method 900 can retain the selected local policy only if the modified NWSU is still greater than an NWSU of the NWSU of the another local policy.

Figure 10:
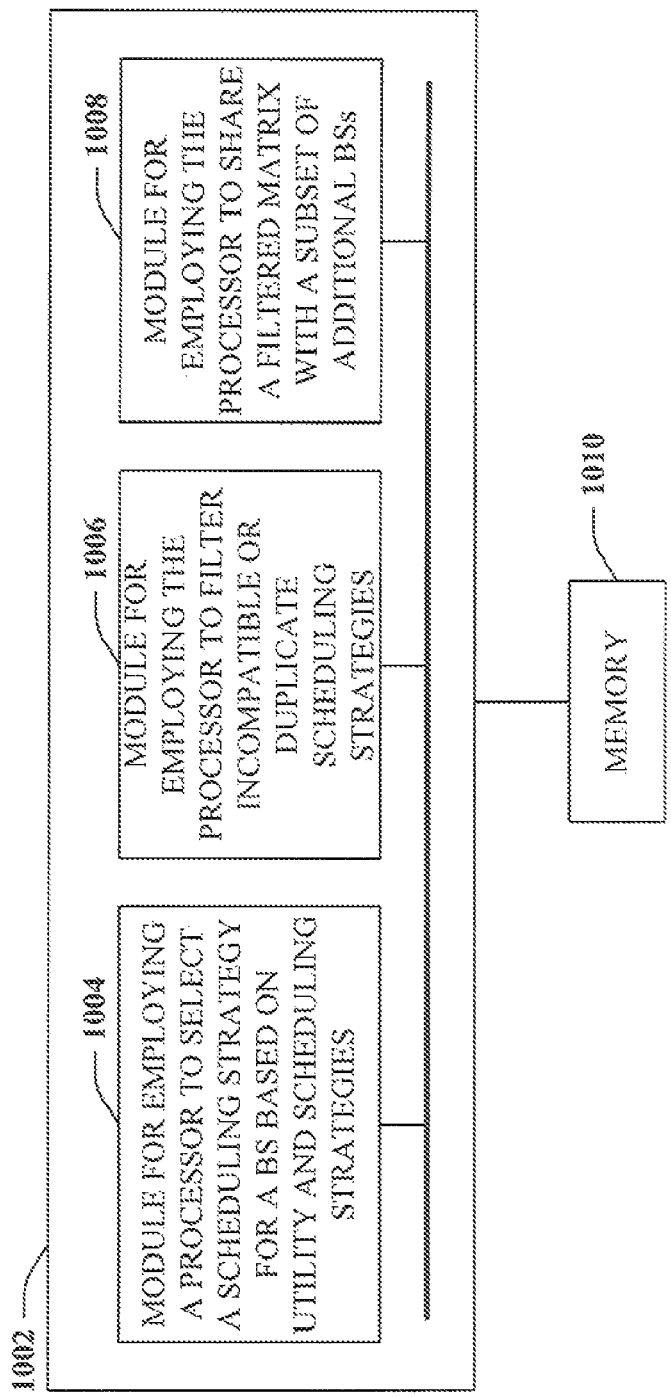
FIG. 10 illustrates a block diagram of an example apparatus that facilitates distributed dynamic CoMP wireless communication according to particular aspects.

FIG. 10 illustrates a block diagram of an example system 1000 that provides improved efficiency in distributed dynamic CoMP wireless communication according to particular aspects of the subject disclosure. For example, system 1000 can reside at least partially within a wireless communication network and/or within a transmitter such as a node, base station, access point, user terminal, personal computer coupled with a mobile interface card, or the like. It is to be appreciated that system 1000 is represented as including functional blocks, which can be functional blocks that represent functions implemented by a processor, software, or combination thereof (e.g., firmware). System 1000 includes a logical grouping 1002 of electrical modules that can act in conjunction. For instance, logical grouping 1002 can include an electrical module 1004 for employing a data processor to select a scheduling strategy for a base station according to estimated utility of the scheduling strategy and respective utility estimates of scheduling strategies of additional base stations involving the base station. Further, logical grouping 1002 can comprise an electrical module 1006 for employing the processor to filter the scheduling strategies of additional base stations involving the base station to remove duplicate or incompatible scheduling strategies. Optionally, electrical module 1006 can comprise a means for identifying and filtering duplicate scheduling strategies of additional base stations. As another option, electrical module 1006 can comprise a means for identifying and filtering scheduling strategies of additional base stations inconsistent with the scheduling strategy for the base station. Moreover, the logical grouping can also comprise an electrical module 1008 for employing the processor to share a filtered matrix comprising scheduling strategies of the base station and of the additional base stations with a subset of the additional base stations. Optionally, electrical module 1008 can comprise means for indexing the scheduling strategy for the base station at least as a function of an ID of the base station, IDs of cooperating base stations per the scheduling strategy, or summed utility (e.g., NWSU). System 1000 can further include memory 1010, which can be employed to store scheduling strategies, rules, protocols or policies for selecting or filtering scheduling strategies, or for exchanging such policies with other electronic devices.

Figure 11:
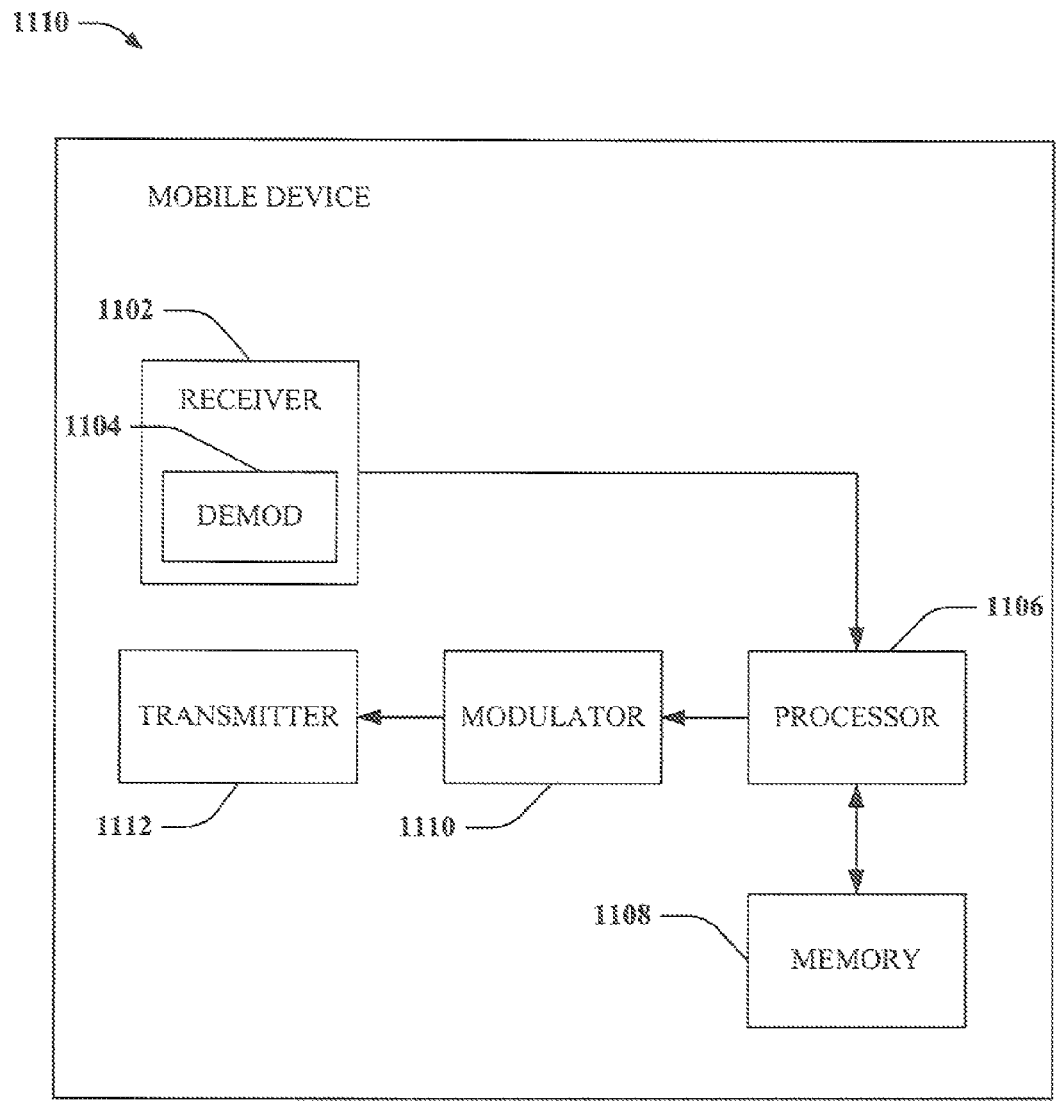
FIG. 11 depicts a block diagram of an example mobile device suitable for CoMP wireless communication according to particular aspects.

FIG. 11 illustrates a block diagram of an example mobile device 1100 according to additional aspects of the subject disclosure. Mobile device 1100 comprises a receiver 1102 that receives a signal from, for instance, a receive antenna (not shown), and performs typical actions (e.g., filters, amplifies, downconverts, etc.) on the received signal to condition the signal, and digitizes the conditioned signal to obtain samples. Receiver 1102 can be, for example, a minimum mean square error (MMSE) receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1112, a processor that controls one or more modules of mobile device 1100, or a processor that analyzes information received by receiver 1102, generates information for transmission by transmitter 1112, and controls one or more components of mobile device 1100.

Mobile device 1100 can additionally comprise memory 1108 that is operatively coupled to processor 1106 and that can store data to be transmitted, received data, and any other suitable information related to performing the various actions and functions set forth herein.

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Mobile device 1100 still further comprises a modulator 1110 and a transmitter 1112 that transmits data, signals, etc. to a base station. Although depicted as being separate from the processor 1106, it is to be appreciated that modulator 1110 can be part of processor 1106 or a number of processors (not shown).

Figure 12:
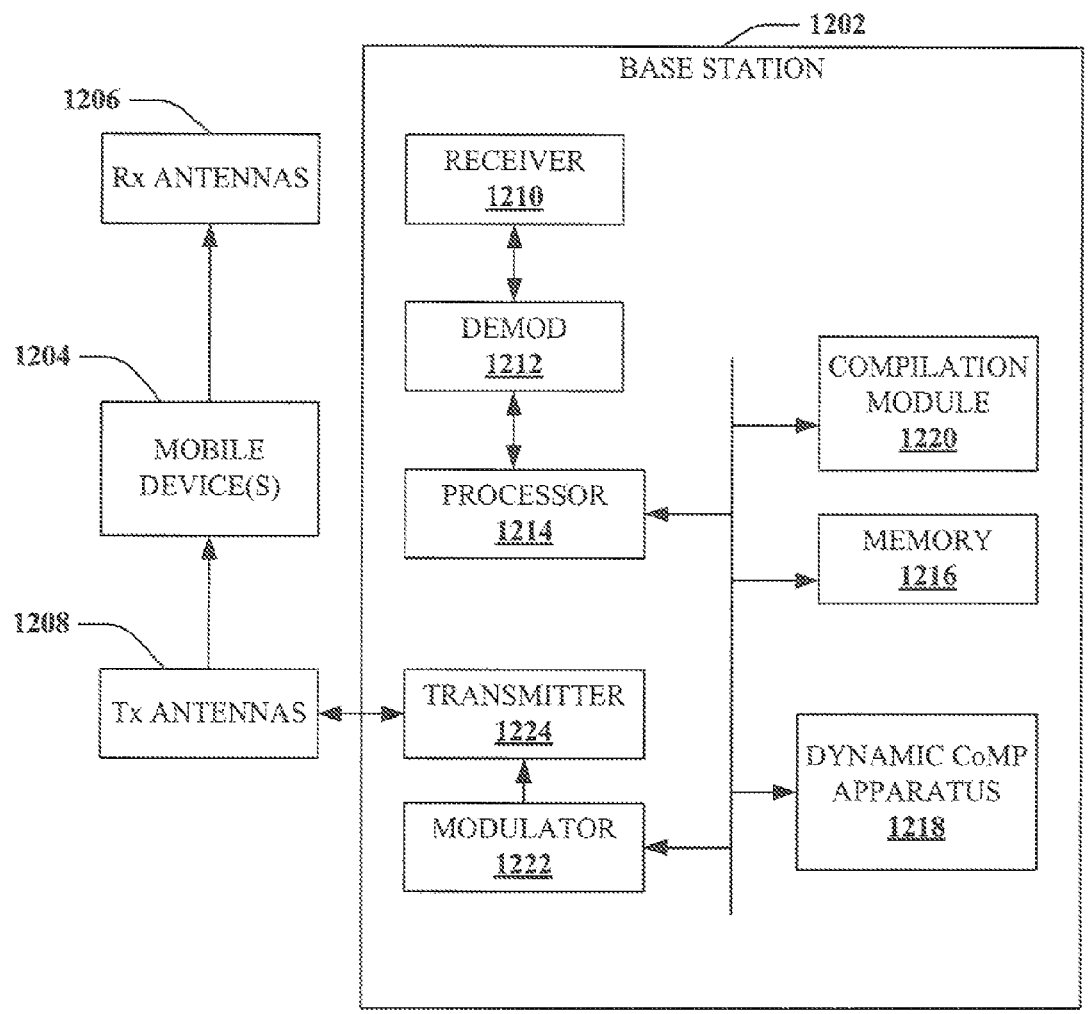
FIG. 12 illustrates a block diagram of an example base station configured for distributed dynamic CoMP communication according to further aspects.

FIG. 12 is an illustration of a system 1200 that dynamically selects a local strategy to employ over time in a wireless communication environment. System 1200 comprises a base station 1202 (e.g., access point, . . . ) with a receiver 1210 that receives signal(s) from one or more mobile devices 1204 through a plurality of receive antennas 1206, and a transmitter 1224 that transmits to the one or more mobile devices 1204 through a transmit antenna 1208. Moreover, base station 1202 can receive signal(s) with receiver 1210 from one or more disparate base stations through the plurality of receive antennas 1206 and/or transmit to one or more disparate base stations with transmitter 1224 through the transmit antenna 1208. According to another illustration, base station 1202 can receive signal(s) from (e.g., with receiver 1210, . . . ) and/or transmit signal(s) to (e.g., with transmitter 1224, . . . ) one or more disparate base stations via a backhaul.

Receiver 1210 can receive information from receive antennas 1206 and is operatively associated with a demodulator 1212 that demodulates received information. Demodulated symbols are analyzed by a processor 1214 that can be similar to the processor described above with regard to FIG. 18, and which is coupled to a memory 1216 that stores data to be transmitted to or received from mobile device(s) 1204 and/or disparate base station(s) and/or any other suitable information related to performing the various actions and functions set forth herein.

Processor 1214 is further coupled to a dynamic CoMP apparatus 1218 and a compilation module 1220. Dynamic CoMP apparatus 1218 can be substantially similar to dynamic CoMP apparatus 100 of FIG. 1, and compilation module 1220 can be substantially similar to compilation module 212 of FIG. 2. For example, dynamic CoMP apparatus 1218 can generate local scheduling policies for base station 1202 and store such policies in memory 1216. Further, apparatus 1218 can evaluate the respective policies for various mobile device topologies (1204), and identify a suitable policy that maximizes a utility function estimate for at least the mobile topology (1204). The evaluation can be based on a subset of policy selection data organized by compilation module 1220 and obtained from neighboring base stations (not depicted) based on respective mobile topologies visible to such base stations. More specifically, the subset of policy selection data can be filtered by apparatus 1218 for relevance, including discarding redundant data, incompatible data, or surplus data over a threshold relevance, as defined herein, or a combination thereof. Apparatus 1218 can employ modulator 1222 and transmitter 1224 to send the suitable policy and subset of policy selection data to a subset of the neighboring base stations for compatibility, and implement the suitable policy if compatible.

Base station 1202 can further include a modulator 1222. Modulator 1222 can multiplex a frame for transmission by a transmitter 1224 through antennas 1208 to mobile device(s) 1204 in accordance with the aforementioned description. Although depicted as being separate from the processor 1214, it is to be appreciated that dynamic CoMP apparatus 1218, or compilation module 1220 can be part of processor 1214 or a number of processors (not shown).

Figure 13:
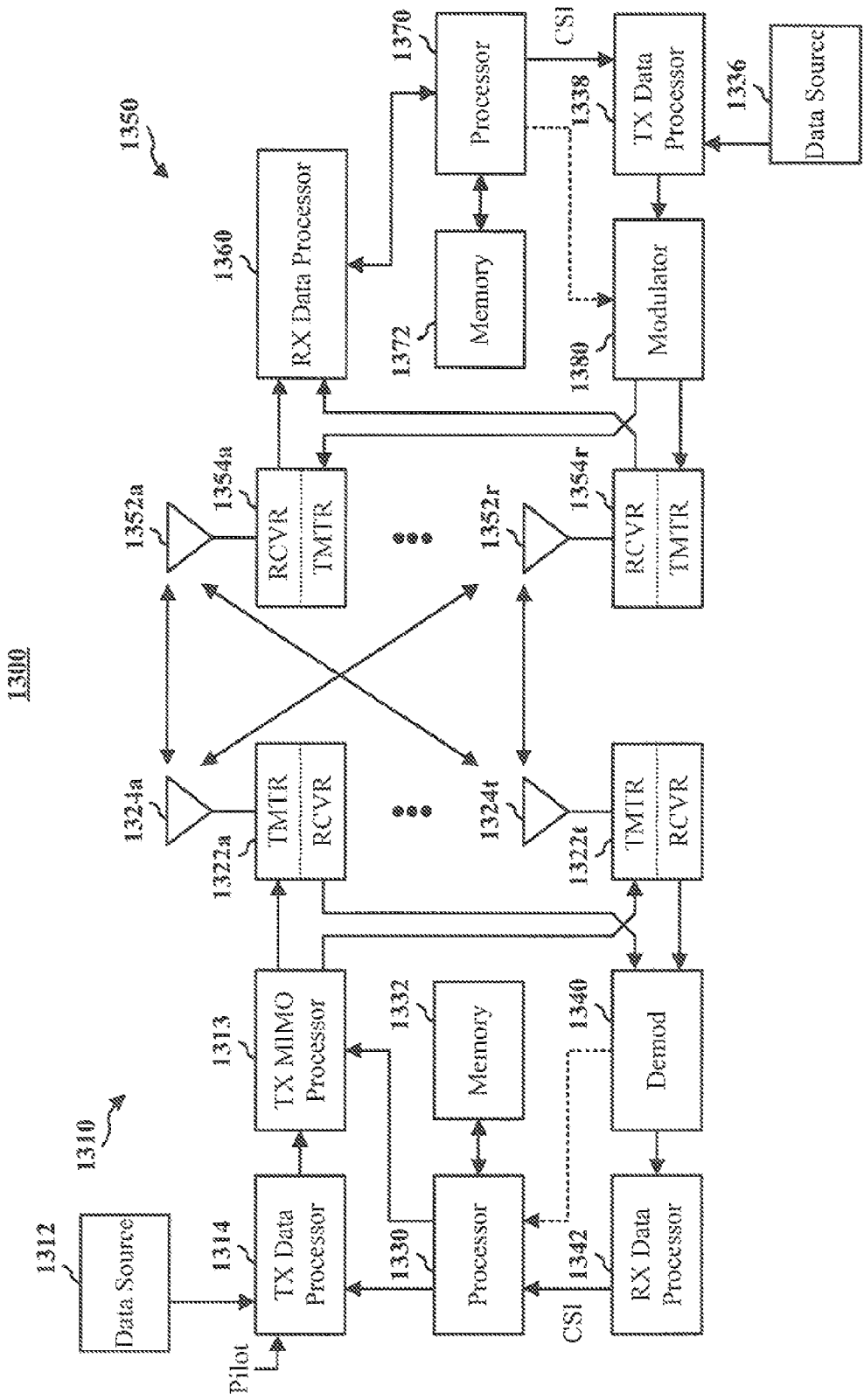
FIG. 13 depicts a block diagram of an example wireless communication arrangement according to still other aspects.

FIG. 13 shows an example wireless communication system 1300. The wireless communication system 1300 depicts one base station 1310 and one mobile device 1350 for sake of brevity. However, it is to be appreciated that system 1300 can include more than one base station or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-5 and 10-12) and/or methods (FIGS. 7-9) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330. Memory 1332 can store program code, data, and other information used by processor 1330 or other components of base station 1310.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ receivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

Various aspects are described herein in connection with a user equipment (UE). A UE can also be called a system, a subscriber unit, a subscriber station, mobile station, mobile, mobile communication device, mobile device, remote station, remote terminal, access terminal (AT), user agent (UA), a user device, or user terminal (UT). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described herein can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless networking, comprising:
employing memory to store code configured for dynamic distributed coordinated multipoint (CoMP) wireless communication; and
employing a processor to execute the code to effect the following:
evaluating a set of local policies of a base station and generating a network utility estimate for respective policies of the set;
exchanging utility and policy selection information with a set of additional base stations;
identifying a redundant utility estimate from received utility information;
generating a truncated network utility matrix that excludes the redundant utility estimate; and
employing the truncated network utility matrix to re-evaluate a subset of the local policies and select a desired policy that at least maximizes a network-wide utility estimate.

2. The method of claim 1, wherein selecting the desired policy further comprises forming a dynamic CoMP cluster with a subset of the additional base stations.

3. The method of claim 2, further comprising sharing a data packet among the subset of the additional base stations for coordinated downlink transmission of the data packet.

4. The method of claim 2, further comprising receiving data from the subset of the additional base stations and participating in coordinated downlink transmission of the data.

5. The method of claim 2, further comprising:
analyzing the desired policy for incompatibility with selected policies of the subset of the additional base stations; and
performing at least one of the following if an incompatibility exists:
canceling transmissions in a time slot associated with the desired policy; or exiting the dynamic CoMP cluster for the time slot and serving a user equipment (UE) not served by the selected policies of the subset of the additional base stations.

6. The method of claim 1, wherein exchanging the utility and policy selection information further comprises generating a matrix of utility and policy selection information received from the set of additional base stations.

7. The method of claim 6, further comprising organizing the matrix to include a policy selection of a network node, a utility estimate of the policy selection of the network node, and at least one of the following:
an identifier (ID) of the network node;
IDs of nodes participating in the policy selection; or
a hop distance to the network node.

8. The method of claim 6, wherein the redundant utility estimate comprises multiple reports of a policy selection of a single network node, and the redundant utility estimate is deleted from the matrix of utility and policy selection information to generate the truncated network utility matrix.

9. The method of claim 1, further comprising including the truncated network utility matrix in a message exchanged with the set of additional base stations.

10. The method of claim 1, wherein selecting the desired policy further comprises:
checking compatibility of the set of local policies with policy selections of the set of additional base stations; and
rejecting incompatible policies.

11. The method of claim 1, wherein generating the truncated network utility matrix further comprises identifying incompatible policies from received policy selection information and removing the incompatible policies.

12. The method of claim 1, wherein generating the truncated network utility matrix further comprises limiting a number of policy selection records in the truncated network utility matrix to a record maximum.

13. The method of claim 12, further comprising;
prioritizing policy selection records, numbering the policy selection records starting from high to low priority; and
discarding policy selection records numbered higher than the record maximum.

14. The method of claim 13, wherein the policy selection records do not include redundant utility estimates or incompatible policy selections of network nodes.

15. The method of claim 1, further comprising employing a network-wide sum utility (NWSU) for the network utility estimate.

16. The method of claim 1, wherein re-evaluating the subset of the local policies further comprises identifying an optimal set of neighboring node policy selections for each respective local policy.

17. The method of claim 16, wherein identifying the optimal set of neighboring node policy selections further comprises:
compiling a list of policy selections of neighboring network nodes provided by the set of additional base stations;
analyzing the list of policy selections and eliminating duplicate policy selections;
selecting a candidate policy from the set of local policies;
analyzing non-duplicate policy selections for compatibility with the candidate policy;
discarding incompatible policy selections;
calculating a NWSU for compatible, non-duplicate policy selections; and
identifying the policy selection having a highest NWSU.

18. The method of claim 17, wherein eliminating duplicate policy selections and discarding incompatible policy selections further comprises at least one of:
retaining a non-residual policy selection having a smallest hop distance if two or more such non-residual policy selections originating from a common node exist;
eliminating a residual policy selection that does not have a highest utility between two or more identical residual policy selections;
eliminating a non-residual policy selection that originates with the base station; or
eliminating policy selections having a utility of zero or substantially zero.

19. The method of claim 1, wherein selecting the desired policy further comprises determining one or more of the local policies that: maximize network utility for all policy selections, have maximum network utility among policy selections that cooperate with the base station, or have maximum network utility among policy selections that do not cooperate with the base station.

20. The method of claim 19, wherein selecting the desired policy further comprises evaluating the one or more of the local policies with respect to a destination node based on at least one of: utility with respect to the destination node, hop distance to the destination node, or cooperative/non-cooperative state of the one or more of the local policies.

21. The method of claim 1, further comprising:
adding a random or pseudo-random noise term to the desired policy if utility of such policy is only minimally better than utility of another local policy; and
selecting the desired policy only if utility of the desired policy plus the noise term is greater than utility of the another local policy.

22. An apparatus for wireless communication in a wireless network, comprising:
memory for storing a set of modules for conducting dynamic coordinated multipoint (CoMP) wireless communication among a set of neighboring base stations; and
at least one processor for executing the set of modules, the set comprising:
an analysis module that estimates respective utilities for time t of a set of local scheduling strategies generated for a base station;
a parsing module that selects a scheduling strategy for use by the base station at time t;
a cooperation module that shares utility or strategy information with a neighboring base station and aggregates utility or strategy information received from the set of neighboring base stations; and
a pruning module that truncates aggregated utility or strategy information based at least in part on relevance to the strategy selected at time t.

23. The apparatus of claim 22, further comprising a compilation module that forms aggregated utility or strategy information into a matrix comprising strategy selection records of additional base stations of the wireless network.

24. The apparatus of claim 23, wherein the compilation module organizes a strategy selection record to include an ID of an originating base station originating a strategy selection.

25. The apparatus of claim 24, wherein the compilation module further organizes the strategy selection record to include at least one of:
IDs of base stations cooperating with the strategy selection;
a hop distance between the base station and the originating base station; or network wide sum utility (NWSU) of the strategy selection.

26. The apparatus of claim 23, wherein the pruning module generates a limited matrix by restricting a number of strategy selection records to a maximum number, and discarding strategy selection records above the maximum number.

27. The apparatus of claim 26, wherein the maximum number is equal to or less than substantially 30 records.

28. The apparatus of claim 26, wherein the strategy selection records are numbered based on a summed utility of such records, and records having a number equal to or less than the maximum number are retained in the limited matrix.

29. The apparatus of claim 26, wherein the strategy selection records are numbered based at least in part on hop distance, and records having a number equal to or less than the maximum number are retained in the limited matrix.

30. The apparatus of claim 26, wherein the cooperation module appends the scheduling strategy for use by the base station at time t to the limited matrix and shares an appended limited matrix with the neighboring base station.

31. The apparatus of claim 30, wherein the utility or strategy information received from the set of neighboring base stations:
comprises a truncated set of strategy selection records;
is filtered for incompatible strategy selection records; or
is filtered for duplicate strategy selection records.

32. The apparatus of claim 22, wherein the pruning module truncates aggregated utility or strategy information by eliminating a subset of duplicate strategy selection records.

33. The apparatus of claim 32, wherein the pruning module retains a duplicate strategy selection record of a set of non-residual duplicate records that has a lowest hop distance or a highest NWSU, and discards all other records of the set of non-residual duplicate records.

34. The apparatus of claim 32, wherein the pruning module retains a duplicate strategy selection record of a set of residual duplicate records that has a highest NWSU.

35. The apparatus of claim 32, wherein the pruning module discards non-residual strategy selection records originating at the base station, and discards strategy selection records having substantially zero utility.

36. The apparatus of claim 22, wherein the pruning module truncates aggregated utility or strategy information by eliminating incompatible strategy selection records.

37. The apparatus of claim 36, wherein:
the analysis module selects a local scheduling strategy $S_n$ of the set of local scheduling strategies $\{S_1, S_2, \ldots, S_n, \ldots, S_m\}$ for utility estimate, where n and m are positive integers;
the pruning module discards strategy selection records having scheduling instructions that conflict with scheduling instructions of scheduling policy $S_n$, and returns a subset of non-discarded strategy selection records with scheduling policy $S_n$; and
the analysis module generates a NWSU estimate for scheduling strategy $S_n$ from estimated utility of scheduling strategy $S_n$ and from respective utility estimates of the subset of non-discarded strategy selection records.

38. The apparatus of claim 37, wherein the parsing module selects the scheduling strategy having a highest NWSU estimate at time t for use by the base station at time t.

39. The apparatus of claim 22, wherein the cooperation module shares truncated utility or strategy selection information with the neighboring base station.

40. The apparatus of claim 39, wherein the truncated utility or strategy selection information does not comprise at least one duplicate record or at least one incompatible scheduling strategy discarded by the pruning module.

41. An apparatus for coordinated multipoint (CoMP) wireless communication, comprising:
means for employing a processor to execute code that selects a scheduling strategy for a base station according to an estimated utility of the scheduling strategy and respective utility estimates of scheduling strategies of additional base stations involving the base station;
means for employing the processor to execute code that filters the scheduling strategies of additional base stations involving the base station to remove duplicate or incompatible scheduling strategies; and
means for employing the processor to execute code that shares a filtered matrix with a subset of the additional base stations, the matrix comprising scheduling strategies of the base station and of the additional base stations.

42. The apparatus of claim 41, further comprising means for identifying and filtering duplicate scheduling strategies of the additional base stations.

43. The apparatus of claim 41, further comprising means for identifying and filtering scheduling strategies of the additional base stations inconsistent with the scheduling strategy for the base station.

44. The apparatus of claim 41, further comprising means for indexing the scheduling strategy for the base station at least as a function of an ID of the base station, IDs of cooperating base stations per the scheduling strategy, or a summed utility.

45. At least one processor configured for coordinated multipoint (CoMP) wireless communication, comprising:
a module for selecting a scheduling strategy for a base station according to an estimated utility of the scheduling strategy and respective utility estimates of scheduling strategies of additional base stations involving the base station;
a module for filtering the scheduling strategies of additional base stations involving the base station to remove duplicate or incompatible scheduling strategies; and
a module for sharing a filtered matrix with a subset of the additional base stations, the matrix comprising scheduling strategies of the base station and of the additional base stations.

46. A computer program product, comprising:
a computer-readable medium, comprising:
code for causing a computer to select a scheduling strategy for a base station according to an estimated utility of the scheduling strategy and respective utility estimates of scheduling strategies of additional base stations involving the base station;
code for causing the computer to filter the scheduling strategies of the additional base stations involving the base station to remove duplicate or incompatible scheduling strategies; and
code for causing the computer to share a filtered matrix with a subset of the additional base stations, the matrix comprising scheduling strategies of the base station and of the additional base stations.

47. The computer program product of claim 46, further comprising code for causing the computer to identify and filter duplicate scheduling strategies of the additional base stations.

48. The computer program product of claim 46, further comprising code for causing the computer to identify and filter scheduling strategies of the additional base stations inconsistent with the scheduling strategy for the base station.

49. The computer program product of claim 46, further comprising code for causing the computer to index the scheduling strategy for the base station at least as a function of an ID of the base station, IDs of cooperating base stations per the scheduling strategy, or a summed utility.

50. The computer program product of claim 49, further comprising code for causing the computer to:
- index a scheduling strategy received from one of the additional base stations at least as a function of hop distance from an originating base station; or
- increment a hop distance index upon receiving a scheduling strategy from another base station that is directly adjacent to the base station.

* * * * *